US 6,748,571 B2
Jun. 8, 2004

(54) SEMICONDUCTOR INSPECTING SYSTEM, SEMICONDUCTOR DEFECT ANALYZING SYSTEM, SEMICONDUCTOR DESIGN DATA MODIFYING SYSTEM, SEMICONDUCTOR INSPECTING METHOD, SEMICONDUCTOR DEFECT ANALYZING METHOD, SEMICONDUCTOR DESIGN DATA MODIFYING METHOD, AND COMPUTER READABLE RECORDED MEDIUM

(75) Inventor: Tadashi Miwa, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/409,205

(22) Filed: Apr. 9, 2003

(65) Prior Publication Data

US 2003/0208731 A1 Nov. 6, 2003

Related U.S. Application Data

(62) Division of application No. 09/817,030, filed on Mar. 27, 2001, now Pat. No. 6,598,210.

(30) Foreign Application Priority Data

Mar. 28, 2000 (JP) ........................................ 2000-089372

(51) Int. Cl.[7] .............................................. G06F 17/50
(52) U.S. Cl. ............................................. 716/4; 716/7
(58) Field of Search ..................... 716/1–21; 702/58, 702/59; 700/108–110; 582/144–154; 714/724

(56) References Cited

U.S. PATENT DOCUMENTS

| 4,809,341 A | * | 2/1989 | Matsui et al. ................ 382/144 |
| 4,855,253 A | * | 8/1989 | Weber ........................... 438/18 |
| 5,240,866 A |   | 8/1993 | Friedman et al. .............. 438/17 |
| 5,379,348 A |   | 1/1995 | Watanabe et al. ............ 348/126 |
| 5,663,967 A | * | 9/1997 | Lindberg et al. ............. 714/737 |
| 6,061,814 A |   | 5/2000 | Sugasawara et al. ......... 714/724 |

FOREIGN PATENT DOCUMENTS

JP 2000-200356 7/2000

* cited by examiner

*Primary Examiner*—Minh Nguyen
(74) *Attorney, Agent, or Firm*—Oblon, Spivak, McClelland, Maier & Neustadt, P.C.

(57) ABSTRACT

A semiconductor inspecting system extracts a region to be inspected from a design data of a semiconductor device and divides the region by a lattice to prepare lattice regions; derives a numerical value indicative of a design characteristic of the design data every one of the lattice regions to prepare a design characteristic item data; prepares a characteristic classification data by classifying the design characteristic item data into a desired number of groups; extracts the lattice regions at random from the characteristic classification data at a constant sampling rate; acquires a defect inspection data by actually inspecting a pattern of the extracted lattice regions processed on the basis of the design data; and calculates the number of defects in the whole region to be inspected on the basis of the defect inspection data, the characteristic classification data and the sampling rate.

16 Claims, 17 Drawing Sheets

WHEN CLASSIFIED BY
PATTERN OCCUPYING RATE

GROUP1 : 0~20(%)
GROUP2 : 20~40(%)
GROUP3 : 40~60(%)
GROUP4 : 60~80(%)
GROUP5 : 80~100(%)

SEMICONDUCTOR INSPECTING SYSTEM, SEMICONDUCTOR DEFECT ANALYZING SYSTEM, SEMICONDUCTOR DESIGN DATA MODIFYING SYSTEM, SEMICONDUCTOR INSPECTING METHOD, SEMICONDUCTOR DEFECT ANALYZING METHOD, SEMICONDUCTOR DESIGN DATA MODIFYING METHOD, AND COMPUTER READABLE RECORDED MEDIUM

CROSS REFERENCE TO RELATED APPLICATION

This application claims benefit of priority under 35USC §119 to Japanese patent application No. 2000-089372, filed on Mar. 28, 2000, the contents of which are incorporated by reference herein.

BACKGROUND OF THE INVENTION

1. Field of the Invention

The present invention relates generally to a semiconductor inspecting system, a semiconductor defect analyzing system, a semiconductor design data modifying system, a semiconductor inspecting method, a semiconductor defect analyzing method, a semiconductor design data modifying system, and a computer readable recorded medium. More specifically, the invention relates to the quantitative analysis of defects, which are generated in a semiconductor device in accordance with the characteristics of the design of the device, the analysis of the cause of the defects, which is carried out on the basis of the quantitative analysis, and the modification of the design using these analyses.

2. Description of the Prior Art

In a conventional inspection in semiconductor devices, particularly in an inspection in an irregular or random pattern, there is used a method for comparing the pattern of a chip C2, which is an object to be inspected, with the pattern of another chip C1 among chips in a semiconductor substrate S to detect the difference there between as a defect DF, as shown in, e.g., the schematic diagram of FIG. 1. According to this detection method, it is required to carry out the inspection for a long time when the area of an inspection region is extended in accordance with the extension of the area of the chip or when the detection sensitivity is raised in order to detect finer defects. In order to shorten the inspection time, there is carried out a so-called random sampling for choosing a region, which is to be inspected in a chip, and a chip, which is to be inspected, at random.

However, when the random sampling is carried out, the true number of defects can not be grasped if the positions of defects are biased, so that there is a problem in that erroneous results are obtained when the total number of defects is quantified.

There are also relatively similar patterns among random patterns. If the random sampling is carried out with respect to such patterns, similar patterns are duplicated to be chosen. For that reason, when defects caused by the characteristics of the patterns are intended to be detected, the inspection efficiency is not only bad, but a pattern to be inspected is also not chosen as an object to be inspected, so that some defects are overlooked.

On the other hand, conventionally, when the cause of defects is intended to be analyzed, detected defects are observed by an electron microscope or the like, and the cause of the defects is guessed. However, it can not be clarified how such defects are caused, particularly, what characteristics of patterns or processes, what variation and what probability the defects are generated, or how these causes are combined to generate the defects, and what range of design characteristics and variation in processes cause the defects.

SUMMARY OF THE INVENTION

It is therefore an object of the present invention to eliminate the aforementioned problems and to provide a semiconductor inspecting system, semiconductor inspecting method and computer readable recorded medium for precisely and efficiently qualifying and outputting defects which are generated in a pattern in accordance with the characteristics of a design.

It is another object of the present invention to provide a semiconductor defect analyzing system, semiconductor defect analyzing method and computer readable recorded medium for analyzing the cause of defects, which are generated in a pattern, in connection with information on a design characteristic and a process result.

It is a further object of the present invention to provide a semiconductor data modifying system, semiconductor data modifying method and computer readable recorded medium capable of utilizing the result of the analysis of defects to modify the design of a pattern in a design stage before a semiconductor process so that the possibility of generating defects is lower.

According to a first aspect of the present invention, there is provided a semiconductor inspecting system comprising: a first memory for storing therein a design data of a semiconductor device; a data retrieving part for extracting an inspected-object region from the first memory, the inspected object region being a region serving as an object to be inspected; a design characteristic item data preparing part for deriving numerical values indicative of design characteristics of the design data every one of lattice regions which are obtained by dividing the inspected object region extracted by the data retrieving part into lattices of an optional size and for preparing a design characteristic item data; a characteristic classification preparing part for classifying the design characteristic item data into a desired number of groups to prepare a characteristic classification data; a sampling part extracting the lattice regions at random from the characteristic classification data at a certain sampling rate with respect to the number of the lattice regions belonging to the groups; a second memory for storing therein a defect inspection data which is a data concerning a defect obtained by inspection with respect to a pattern of the lattice regions extracted at the sampling rate from processed patterns which are processed on the basis of the design data; and an operation part for calculating the number of defects in the whole inspected object region on the basis of the defect inspection data, the character classification data and the sampling rate.

According to the first aspect of the semiconductor inspecting system according to the present invention, the design characteristic item data preparing part derives a numerical number indicative of the design characteristic of the design data and prepares the design characteristic item data, and the characteristic classification data preparing part classifies the design characteristic item data into the desired number of groups to prepare the characteristic classification data. Moreover, the operation part calculates the number of defects in the whole inspected object region on the basis of the defect inspection data, the character classification data and the sampling rate. Therefore, it is possible to more accurately quantify defects caused by a design of a semiconductor device.

It is advantageous in the semiconductor inspecting system that the defect inspection data include a data on the degree of defects and the operation part outputs the sum total of defects every degree of defects.

The defect inspection data may be a data obtained by comparing an ideal shape data, which is a simulation result based on the design data, with a shape data of the defects in the processed pattern.

The characteristic classification data preparing part may classify the design characteristic item data using a neural network.

According to a second aspect of the invention, there is provided a semiconductor defect analyzing system comprising: a first memory for storing therein a design data of a semiconductor device; a data retrieving part for extracting an inspected object region from the first memory, the inspected object region being a region serving as an object to be inspected; a second memory for storing therein a defect inspection data concerning an actual defect and a degree of the defect which are obtained by inspecting a processed pattern which is processed on the basis of the design data; a design data processing part for acquiring a first lattice region by dividing the inspected object region by a lattice having an optional size on the defect inspection data so that a place at which the defect has occurred is arranged at the center thereof, the optional size being given as a parameter, and for acquiring a second lattice region by dividing the inspected object region by the lattice on the basis of the defect inspection data so that a non-defective place of the processed pattern is arranged at the center thereof, the non-defective place being a place which is appropriately processed, and for preparing a first design characteristic item data and a second design characteristic item data every second lattice region and every second lattice region respectively by deriving a numerical value indicative of a design characteristic of the design data every first lattice region and every second lattice region respectively; a third memory for storing therein a data on an observable process result relating to a processing of the pattern based on the design data; a process data processing part for collecting a value of a first process result corresponding to a pattern in the first lattice region, and a value of a second process result corresponding to a pattern in the second lattice region; and a defect occurrence rule preparing part for preparing a defect occurrence rule by correlating a combination of the first design characteristic item data and a value of the first process result with the defect and the degree of the defect and by correlating a combination of the second design characteristic item data and a value of the second process result with the defect and the degree of the defect.

According to the second aspect of the semiconductor defect analyzing system according to the present invention, the defect occurrence rule preparing part prepares the defect occurrence rule by correlating the combination of the first design characteristic item data and the first process result value with the defect and the degree of the defect and by correlating the combination of the second design characteristic item data and the second process result value with the defect and the degree of the defect, so that it is possible to calculate the defect occurring probability with respect to the combination of the design characteristic and the process result causing the defect, the presence of a defect and the degree thereof. Consequently, it is possible to calculate a defect occurring probability with respect to the combination of a design characteristic causing the defect, the process result, the presence of the defect and the degree thereof.

The defect inspection data may preferably be a data prepared on the comparison of an ideal shape data with a shape data of the defect in the processed pattern, the ideal shape data being a simulation result based on the design data.

In the semiconductor defect analyzing system according to the second aspect, it is advantageous that the plurality of lattice sizes are given as the parameters, the design data processing part changes the lattice sizes on the basis of the parameters to prepare the first design characteristic item data and the second design characteristic item data with respect to the plurality of first lattice regions and the plurality of second lattice regions, respectively, the process data processing part collecting a value of the first process result and a value of the second process result from the third memory with respect to the first lattice regions having a plurality of sizes and the second lattice regions, respectively, the defect occurrence rule preparing part preparing the defect occurrence rule by correlating a combination of the lattice size, the first design characteristic item data and a value of the first process result with the defect and the degree of the defect and by correlating a combination of the lattice size, the second design characteristic item data and a value of the second process result with the defect and the degree of the defect.

According to a third aspect of the present invention, there is provided a semiconductor defect analyzing system comprising: a first memory for storing therein a design data of a semiconductor device; a second memory for storing therein a first size and a second size as parameters, the first size and the second size being optional sizes of a lattice used for dividing an inspected object region of a semiconductor device, and, the inspected object region being a region serving as an object to be inspected; a data retrieving part for extracting the inspected object region from the first memory; a design characteristic item data preparing part for preparing a first design characteristic item data by deriving a numerical value indicative of a design characteristic of the design data every first lattice region, the first lattice region being obtained by dividing the extracted inspected object region into lattices of the first size; a characteristic classification data preparing part for preparing a first characteristic classification data by classifying the first design characteristic item data into a desired number of groups; a third memory for storing therein a data on a sampling rate for extracting samples at random from the first characteristic classification data; a sampling part for extracting the first lattice regions at random from the first characteristic classification data at the sampling rate with respect to the number of the lattice regions belonging to the groups; a fourth memory for storing therein a defect inspection data concerning an actual defect and the degree of the defect which are obtained by inspecting places corresponding to the first lattice regions extracted at the sampling rate from a processed pattern which is processed on the basis of a design data; a design data processing part for acquiring second lattice regions by dividing the inspected object region into lattices of the second sizes so that a place causing the defect is arranged at the center thereof on the basis of the defect inspection data, for acquiring third lattice regions by dividing the inspected object region into lattices of the second size so that a non-defective place is arranged at the center thereof on the basis of the inspection result data, for deriving a numerical value indicative of a design characteristic of the design data every one of the second lattice regions to prepare a second design characteristic item data and for deriving a numerical value indicative of a design characteristic of the design data every one of the third lattice regions to prepare a third design characteristic item data every one of the third lattice regions; a fifth memory for storing therein a data on an observable process result relating to a processing of the pattern based on the design data; a process data processing part for collecting a value of a first process result corresponding to a pattern in the second lattice regions and a value of a second process result corresponding to a pattern in the third lattice regions, from the data on the process results respectively; and a defect occurrence rule preparing part for preparing a defect occurrence rule by correlating a combination of the second design characteristic item data and the value of the first process result with the defect and the degree of the defect and by correlating the a combination of the third design characteristic item data and the value of the second process result with the defect and the degree of the defect.

Preferably, in the semiconductor defect analyzing system according to the third aspect, the design data processing part changes the second size to prepare the second design characteristic item data and the third design characteristic item data with respect to the second lattice regions of a plurality of sizes and third lattice regions of a plurality of sizes respectively, the process data processing part collects the value of the first process result and the value of the second process result with respect to the second lattice region of the plurality of sizes and the third lattice region of the plurality of sizes respectively, and the defect occurrence rule preparing part prepares the defect occurrence rule by correlating each combination of each second size, the second design characteristic item data and the value of the first process result with the defect and the degree of the defect and by correlating each combination of each second size, the third design characteristic item data and the value of the second process result with the defect and the degree of the defect.

The defect inspection data may preferably be a data prepared on the comparison of an ideal shape data with a shape data of the defect in the processed pattern, the ideal shape data being a simulation result based on the design data.

The characteristic classification data preparing part may classify the design characteristic item data using a neural network.

In addition, the characteristic classification data preparing part may prepare the defect occurrence rule using a statistical technique including a decision tree.

According to a fourth aspect of the invention, there is provided a semiconductor design data modifying system comprising: a memory for storing therein a data on a defect occurrence rule obtained by analyzing a correlation between the presence of the defect and the degree of the defect and a combination of a design characteristic causing a defect and a value of a process result relating to the design characteristic; a pattern checking part for extracting a pattern capable of causing a defect from the design data on the basis of the defect occurrence rule; a design data modifying part for modifying the design data with respect to the extracted pattern to output a modified design data; a modified design data processing part for receiving a data on an optical lattice size and a data on an optional lattice interval as first parameters which are used to analyze the modified design data, for dividing the modified design data into optional combinations of the lattice interval and the lattice size, for deriving numerical values indicative of design characteristics of the modified design data with respect to the obtained lattice region, and for preparing a modified design characteristic item data; and an operation part for comparing the modified design characteristic item data with the defect occurrence rule and for calculating a defect probability which is a defect causing probability.

According to the fourth aspect of a semiconductor design data modifying system according to the present invention, the pattern checking part extracts the pattern capable of causing the defect from the design data on the basis of the defect occurrence rule, and the design modifying part modifies the design data with respect to the extracted pattern, so that it is possible to modify a design with some possibility of causing a defect in a design stage of a semiconductor device. In addition, the operation part compares the modified design characteristic item data with a defect occurrence rule to calculate a defect possibility, so that it is possible to previously estimate a defect occurring possibility due to the design in the design stage of the semiconductor device.

The defect occurrence rule may be supplied from the semiconductor defect analyzing system according to the second and third aspects.

It is preferable that a data on a desired threshold is applied to the operation part as a second parameter and that the semiconductor design data modifying system further comprises a re-modification command part for comparing the defect probability with the desired threshold and for supplying a command for modifying the modified design data again to the design data modifying part, the design data processing part and the operation part until the probability of the failure reaches the desired threshold or until the probability of the failure reaches a minimum value.

According to a fifth aspect of the present invention, there is provided a semiconductor design data modifying system comprising: a first memory for storing therein a design data of a semiconductor device; a data retrieving part for extracting an inspected object region from the first memory, the inspected object being a region serving as an object to be inspected; a design characteristic item data preparing part for deriving a numerical value indicative of a design characteristic of the design data every one of first lattice regions which are obtained by dividing the inspected object region extracted by the data retrieving part into lattices of a first size and for preparing a first design characteristic item data; a characteristic classification data preparing part for preparing a first characteristic classification data by classifying the first design characteristic item data into a desired number of groups; a sampling part for extracting the first lattice regions at random from the first characteristic classification data at a constant sampling rate with respect to the number of the first lattice regions belonging to the groups; a second memory for storing therein a defect inspection data on an actual defect and the degree of the defect which are obtained by inspecting a pattern of the first lattice regions of patterns processed on the basis of the design data, the first lattice regions being extracted at the sampling rate; a design data processing part for acquiring a second lattice region by dividing the inspected object region into lattices of an optional second size so that a place at which the defect occurs is arranged at the center thereof on the basis of the defect inspection data, and for acquiring a third lattice region by dividing the inspected object region into lattices of the second size so that a non-defective place of the processed pattern is arranged at the center thereof on the basis of the defect inspection data, for deriving a numerical value indicative of a design characteristic of the design data every one of the second lattice regions to prepare a second design characteristic item data and for deriving a numerical value indicative of a design characteristic of the design data every one of the third lattice regions to prepare a third design characteristic item data, the optional second size being given as a first parameter, and, the non-defective place being appropriately processed; a third memory for storing therein a data on an observable process result relating to a processing of the pattern based on the design data; a process data processing part for collecting a value of a first process result corresponding to a pattern in the second lattice region and a value of a second process result corresponding to a pattern in the third lattice region from the third memory respectively; a defect occurrence rule preparing part for preparing a defect occurrence rule by correlating a combination of the second design characteristic item data and the value of the first process result with the defect and the degree of the defect and by correlating a combination of the third design characteristic item data and the value of the second process result with the defect and the degree of the defect; a pattern checking part for extracting a pattern capable of causing a defect from the design data on the basis of the defect occurrence rule; a design data modifying part for modifying the design data with respect to the extracted pattern to output the modified design data; a modified design data processing part for obtaining a fourth lattice region by dividing the modified design data by an optional combination of an optional lattice interval and the lattices of an optional third size, and for deriving a numerical value indicative of a design characteristic of the design data with respect to the fourth lattice region to prepare a fourth design characteristic item data, the optional third size being given as a second parameter, and, the optional lattice interval being applied as a third parameter; and an operation part for comparing the fourth design characteristic item data with the defect occurrence rule to calculate a probability of a failure, which is a defect causing probability.

In the fifth aspect of the invention, it is advantageous that a desired threshold is given to the operation part as a fourth parameter and that semiconductor design data modifying system further comprises a re-modification command part for comparing the probability of the failure with the desired threshold and for supplying a command for modifying the modified design data again to the design data modifying part, the design data processing part and the operation part until the probability of the failure reaches the desired threshold or until the probability of the failure reaches the minimum value.

According to a sixth aspect of the present invention, there is provided a semiconductor inspecting method comprising the steps of: extracting an inspected object region from a design data of a semiconductor device and dividing the inspected object region by a lattice of an optional size to prepare lattice regions, the inspected object region serving as an object to be inspected; deriving a numerical value indicative of a design characteristic of the design data every one of the lattice regions to prepare a design characteristic item data; preparing a characteristic classification data by classifying the design characteristic item data into a desired number of groups; extracting the lattice regions at random from the characteristic classification data at a constant sampling rate with respect to the number of the lattice regions belonging to the group; actually inspecting a pattern of the lattice regions of a processed pattern which is processed on the basis of the design data, the pattern of the lattice regions having been extracted at the sampling rate, and acquiring a defect inspection data which is a data concerning a defect; and calculating the number of defects in the whole inspected object region on the basis of the defect inspection data, the characteristic classification data and the sampling rate.

According to the sixth aspect of the present invention, a semiconductor inspecting method comprises the steps of deriving a numerical value indicative of the design characteristic of the design data to prepare the design characteristic item data, classifying the design characteristic item data into the desired number of groups to prepare the characteristic classification data, and calculating the number of defects in the whole inspected object region on the basis of a defect inspection data, the characteristic classification data and a sampling rate, so that it is possible to more precisely quantify the defects due to the design of a semiconductor device.

In the sixth aspect, the step of acquiring the defect inspection data may preferably include a step of comparing the shape of a defect in the processed pattern with an ideal shape every one of the lattice regions which are extracted at the step of extracting the lattice regions, the ideal shape being the result of a simulation based on the design data, and preparing the defect inspection data on the basis of the result of the comparison.

Furthermore, the data concerning the defects may include a data on the degree of defects, and the step of calculating the number of defects may be a step of calculating the number of defects every degree of defects.

The step of preparing the characteristic classification data may be a step of classifying the design characteristic item data using a neural network.

In addition, the step of preparing the characteristic classification data may be a step of classifying the design characteristic item data using a statistical technique including a decision tree.

According to a seventh aspect of the present invention, there is provided a semiconductor defect analyzing method comprising the steps of: acquiring first lattice regions by dividing an inspected object region in the design data by a lattice having an optional size on the basis of a defect inspection data concerning an actual defect and a degree of the defect so that a place at which the defect occurs is arranged at the center thereof, deriving a numerical value indicative of a design characteristic of the design data every one of the first lattice regions and preparing a first design characteristic item data, the defect and the degree of the defect being obtained by inspecting a processed pattern which is processed on the basis of a design data; collecting a value of a first process result corresponding to a pattern in the first lattice regions on the basis of a data on an observable process result relating to a processing of the pattern based on the design data; acquiring second lattice regions by dividing the inspected object region by a lattice of the optional size on the basis of the defect inspection data so that an appropriate processed non-defective place is arranged at the center thereof, and deriving a numerical value indicative of a design characteristic of the design data every one of the second lattices and for preparing a second design characteristic item data; collecting a value of a second process result corresponding to a pattern in the second lattice regions from a data on the process result; and preparing a defect occurrence rule by correlating a combination of the first design characteristic item data and a value of the first process result with the defect and the degree of the defect and by correlating a combination of the second design characteristic item data and a value of the second process result with the defect and the degree of the defect.

According to a seventh aspect of the present invention, a semiconductor defect analyzing method comprises a step of preparing a defect occurrence rule by correlating a combination of the first design characteristic item data and the value of the first process result with the defect and the degree of the defect and by correlating a combination of the second design characteristic item data and the value of the second process result with the defect and the degree of the defect, so that it is possible to calculate a defect occurring probability with respect to the combination of a design characteristic causing the defect, the process result, the presence of the defect and the degree thereof.

In the seventh aspect, the defect inspection data is preferably a data prepared on the comparison of an ideal shape data with a shape data of the defect in the processed pattern, the ideal shape data being a simulation result based on the design data.

Furthermore, it is advantageous that the semiconductor defect analyzing method may further comprises a step of repeating sequentially the steps from the step of preparing the first design characteristic item data to the step of collecting the value of the second process result while changing the size of the lattices to prepare the first design characteristic item data and the value of the first process result with respect to each of the first lattice regions of a plurality of sizes and to prepare the second design characteristic item data and the value of the second process result with respect to each of the second lattice regions of the plurality of sizes before the step of acquiring the correlation and the step of preparing the defect occurrence rule.

According to an eighth aspect of the present invention, there is provided a semiconductor defect analyzing method comprising the steps of: extracting an inspected object region from a design data of a semiconductor device and preparing first lattice regions by dividing the inspected object region into lattices of an optional first size, the inspected object region serving as an object to be inspected, and, the optional first size being given as a first parameter; preparing a first design characteristic item data by deriving a numerical number indicative of a design characteristic of the design data every one of the first lattice regions; preparing a characteristic classification data by classifying the design characteristic item data into a desired number of groups; extracting the lattice regions at random from the characteristic classification data at a constant sampling rate with respect to the number of the lattice regions belonging to the groups; acquiring second lattice regions by dividing the inspected object region in the design data into lattices of a second size so that a place causing the defect is arranged at the center thereof on the basis of a defect inspection data relating to an actual defect and a degree of the defect of the processed patterns which are processed on the basis of the design data, the second size being given as a second parameter, and, the actual defect and the degree of the defect being obtained by inspecting a pattern of the lattice region which is extracted at the sampling rate; deriving a numerical value indicative of a design characteristic of the design data every one of the second lattice regions to prepare a second design characteristic item data; collecting a value of a first process result corresponding to a pattern in the second lattice regions on the basis of a data on an observable process result relating to a processing of the pattern based on the design data; obtaining third lattice regions by dividing the inspected object region into lattices of the second size so that a processed non-defective place is arranged at the center thereof on the basis of the defect inspection data and deriving a numerical value indicative of a design character-istic of the design data every one of the obtained third lattice regions to prepare a third design characteristic item data; collecting a value of a second process result corresponding to a pattern in the third lattice regions from a data on the process result; preparing a defect occurrence rule by acquiring a first correlation between the defect and the degree of the defect and a combination of the second design characteristic item data and the value of the first process result, and a second correlation between the value of the second process result and the defect and the degree of the defect and a combination of the third design characteristic item data.

In the eighth aspect, it is advantageous that the semiconductor defect analyzing method may further comprises a step of repeating sequentially the steps from the step of preparing the second design characteristic item data to the step of collecting the value of the second process result while changing the second size of the lattices to prepare the second design characteristic item data and the value of the first process result with respect to each of the second lattice regions of a plurality of sizes and to prepare the third design characteristic item data and the value of the second process result with respect to each of the third lattice regions of the plurality of sizes before the step of acquiring the first correlation and the second correlation and the step of preparing the defect occurrence rule.

The step of preparing the defect occurrence rule may acquire the correlations using a neural network or a statistical technique including a decision tree.

In the seventh aspect, the defect inspection data is preferably a data prepared on the comparison of an ideal shape data with a shape data of the defect in the processed pattern, the ideal shape data being a simulation result based on the design data.

According to a ninth aspect of the present invention, there is provided a semiconductor design data modifying method comprising the steps of: extracting a pattern capable of causing a defect from a design data of a semiconductor device on the basis of a defect occurrence rule which is prepared on the basis of the design data and which is indicative of a correlation of the presence of the defect and the degree of the defect and a combination of a design characteristic of the design data causing a defect and a value of a process result relating to the design characteristic; modifying the design data with respect to the extracted pattern to output a modified design data; acquiring lattice regions by dividing the modified design data by an optional combination of a lattice of an optional size and an optional lattice interval, deriving a numerical value indicative of a design characteristic of the modified design data with respect to each of the lattice regions and preparing a modified design characteristic item data; and comparing the modified design characteristic item data with the defect occurrence rule to calculate a probability of a failure, which is a defect causing probability.

According to the ninth aspect of the present invention, the semiconductor design data modifying method comprises the steps of extracting a pattern capable of causing the defect from the design data on the basis of the defect occurrence rule, and modifying the design data with respect to the extracted pattern, so that it is possible to modify a design with some possibility of causing the defect in the design stage of a semiconductor device. The semiconductor design data modifying method further comprises the step of comparing the modified design characteristic item data with the defect occurrence rule to calculate a probability of a failure, so that it is possible to previously estimate a possibility of generating the failure due to the design of a semiconductor device in a design stage of a semiconductor device.

In the ninth aspect, the defect occurrence rule is preferably prepared by the semiconductor defect analyzing method according to the sixth or seventh aspect.

According to a tenth aspect of the present invention, there is provided a semiconductor design data modifying method comprising the steps of: extracting an inspected object region from a design data of a semiconductor device and preparing first lattice regions by dividing the inspected object region into lattices of an optional first size, the inspected object region serving as an object to be inspected, and, the optional first size being given as a first parameter; preparing a first design characteristic item data by deriving a numerical value indicative of a design characteristic of the design data every one of the first lattice regions; preparing a first characteristic classification data by classifying the design characteristic item data into a desired number of groups; extracting the first lattice regions at random from the first characteristic classification data at a constant sampling rate with respect to the number of the lattice regions belonging to the groups; obtaining a defect inspection data concerning an actual defect and a degree of the defect by inspecting a pattern of the first lattice regions, the actual defect and the degree of the defect being extracted at the sampling rate; acquiring second lattice regions by dividing the inspected object region in the design data into lattices of a second size on the basis of the defect inspection data concerning the actual defect and the degree of the defect of processed patterns so that a place causing the defect is arranged at the center thereof on the basis of the design data and preparing a second design characteristic item data by deriving a numerical value indicative of a design characteristic of the design data every one of the second lattice regions, the second size being given as a second parameter; collecting a value of a first process result corresponding to a pattern in the second lattice regions on the basis of a data on an observable process result relating to a processing of the pattern based on the design data; acquiring third lattice regions by dividing the inspected object region into lattices of the second size on the basis of the defect inspection data so that a non-defective place processed on the basis of the defect inspection data is arranged at the center thereof and preparing a third design characteristic item data by deriving a numerical value indicative of a design characteristic of the design data every one of the third lattice regions; collecting a value of a second process result corresponding to a pattern in the third lattice regions from a data on the observable process result; preparing a defect occurrence rule by acquiring a first correlation between the defect and the degree of the defect and a combination of the second design characteristic item data and the value of the first process result and by acquiring a second correlation between the defect and the degree of the defect and a combination of the third design characteristic item data and the value of the second process result; extracting a pattern capable of causing the defect from the design data on the basis of the defect occurrence rule; modifying the design data with respect to the extracted pattern to output the modified design data; obtaining fourth lattice regions by dividing the modified design data by an optional combination of the lattice of the third size and an optional lattice interval, the optional third size being given as a third parameter, and, the optional lattice interval being given as a fourth parameter; preparing a fourth design characteristic item data by deriving a numerical value indicative of a design characteristic of the modified design data with respect to each of the fourth lattice regions; and calculate a probability of a failure, which is a defect causing probability, by comparing the fourth design characteristic item data with the defect occurrence rule.

The semiconductor design data modifying method according to the tenth aspect preferably further comprises a step of repeating the steps from the step of extracting the pattern capable of causing the defect to the step of calculating the defect probability while comparing the defect probability with a desired threshold until the probability of the failure reaches the desired threshold or until the probability of the failure reaches the minimum value.

According to a eleventh aspect of the present invention, there is provided a computer readable recorded medium in which a program for causing a computer to execute a semiconductor inspecting method has been recorded, the semiconductor inspecting method comprising the steps of: extracting an inspected object region from a design data of a semiconductor device and dividing the inspected object region by a lattice of an optional size to prepare lattice regions, the inspected object region serving as an object to be inspected; deriving a numerical value indicative of a design characteristic of the design data every one of the lattice regions to prepare a design characteristic item data; preparing a characteristic classification data by classifying the design characteristic item data into a desired number of groups; extracting the lattice regions at random from the characteristic classification data at a constant sampling rate with respect to the number of the lattice regions belonging to the group; actually inspecting a pattern of the lattice regions of a processed pattern which is processed on the basis of the design data, the pattern of the lattice regions having been extracted at the sampling rate, and acquiring a defect inspection data which is a data concerning a defect; and calculating the number of defects in the whole inspected object region on the basis of the defect inspection data, the characteristic classification data and the sampling rate.

In the eleventh aspect, the step of calculating the number of defects may preferably include a step of comparing the shape of a defect in the processed pattern with an ideal shape every one of the lattice regions which are extracted at the step of extracting the lattice regions, the ideal shape being the result of a simulation based on the design data, and preparing the defect inspection data on the basis of the result of the comparison.

Furthermore, the data concerning the defects may include a data on the degree of defects, and the step of calculating the number of defects may be a step of calculating the number of defects every degree of defects.

The step of preparing the characteristic classification data may be a step of classifying the design characteristic item data using a neural network.

According to a twelfth aspect of the present invention, there is provided a computer readable recorded medium in which a program for causing a computer to execute a semiconductor defect analyzing method, the semiconductor defect analyzing method comprising the steps of: acquiring first lattice regions by dividing an inspected object region in the design data by a lattice having an optional size on the basis of a defect inspection data concerning an actual defect and a degree of the defect so that a place at which the defect occurs is arranged at the center thereof, deriving a numerical value indicative of a design characteristic of the design data every one of the first lattice regions and preparing a first design characteristic item data, the defect and the degree of the defect being obtained by inspecting a processed pattern which is processed on the basis of a design data; collecting a value of a first process result corresponding to a pattern in the first lattice regions on the basis of a data on an observable process result relating to a processing of the pattern based on the design data; acquiring second lattice regions by dividing the inspected object region by a lattice of the optional size on the basis of the defect inspection data so that an appropriate processed non-defective place is arranged at the center thereof, and deriving a numerical value indicative of a design characteristic of the design data every one of the second lattices and for preparing a second design characteristic item data; collecting a value of a second process result corresponding to a pattern in the second lattice regions from a data on the process result; and preparing a defect occurrence rule by correlating a combination of the first design characteristic item data and a value of the first process result with the defect and the degree of the defect and by correlating a combination of the second design characteristic item data and a value of the second process result with the defect and the degree of the defect.

In the twelfth aspect, it is advantageous that the semiconductor defect analyzing method may further comprises a step of repeating sequentially the steps from the step of preparing the first design characteristic item data to the step of collecting the value of the second process result while changing the size of the lattices to prepare the first design characteristic item data and the value of the first process result with respect to each of the first lattice regions of a plurality of sizes and to prepare the second design characteristic item data and the value of the second process result with respect to each of the second lattice regions of the plurality of sizes before the step of acquiring the correlation and the step of preparing the defect occurrence rule.

According to a thirteenth aspect of the present invention, there is provided a computer readable recorded medium in which a program for causing a computer to execute a semiconductor defect analyzing method, the semiconductor defect analyzing method comprising the steps of: extracting an inspected object region from a design data of a semiconductor device and preparing first lattice regions by dividing the inspected object region into lattices of an optional first size, the inspected object region serving as an object to be inspected, and, the optional first size being given as a first parameter; preparing a first design characteristic item data by deriving a numerical number indicative of a design characteristic of the design data every one of the first lattice regions; preparing a characteristic classification data by classifying the design characteristic item data into a desired number of groups; extracting the lattice regions at random from the characteristic classification data at a constant sampling rate with respect to the number of the lattice regions belonging to the groups; acquiring second lattice regions by dividing the inspected object region in the design data into lattices of a second size so that a place causing the defect is arranged at the center thereof on the basis of a defect inspection data relating to an actual defect and a degree of the defect of the processed patterns which are processed on the basis of the design data, the second size being given as a second parameter, and, the actual defect and the degree of the defect being obtained by inspecting a pattern of the lattice region which is extracted at the sampling rate; deriving a numerical value indicative of a design characteristic of the design data every one of the second lattice regions to prepare a second design characteristic item data; collecting a value of a first process result corresponding to a pattern in the second lattice regions on the basis of a data on an observable process result relating to a processing of the pattern based on the design data; obtaining third lattice regions by dividing the inspected object region into lattices of the second size so that a processed non-defective place is arranged at the center thereof on the basis of the defect inspection data and deriving a numerical value indicative of a design characteristic of the design data every one of the obtained third lattice regions to prepare a third design characteristic item data; collecting a value of a second process result corresponding to a pattern in the third lattice regions from a data on the process result; preparing a defect occurrence rule by acquiring a first correlation between the defect and the degree of the defect and a combination of the second design characteristic item data and the value of the first process result, and a second correlation between the value of the second process result and the defect and the degree of the defect and a combination of the third design characteristic item data.

In the thirteenth aspect, it is advantageous that the semiconductor defect analyzing method may further comprises a step of repeating sequentially the steps from the step of preparing the second design characteristic item data to the step of collecting the value of the second process result while changing the second side of the lattices to prepare the second design characteristic item data and the value of the first process result with respect to each of the second lattice regions of a plurality of sizes and to prepare the third design characteristic item data and the value of the second process result with respect to each of the third lattice regions of the plurality of sizes before the step of acquiring the first correlation and the second correlation and the step of preparing the defect occurrence rule.

The step of preparing the defect occurrence rule may acquire the correlations using a neural network or a statistical technique including a decision tree.

In the thirteenth aspect, the defect inspection data is preferably a data prepared on the comparison of an ideal shape data with a shape data of the defect in the processed pattern, the ideal shape data being a simulation result based on the design data.

According to a fourteenth aspect of the present invention, there is provided a computer readable recorded medium in which a program for causing a computer to execute a semiconductor design data modifying method, the semiconductor design data modifying method comprising the steps of: extracting a pattern capable of causing a defect from a design data of a semiconductor device on the basis of a defect occurrence rule which is prepared on the basis of the design data and which is indicative of a correlation of the presence of the defect and the degree of the defect and a combination of a design characteristic of the design data causing a defect and a value of a process result relating to the design characteristic; modifying the design data with respect to the extracted pattern to output a modified design data; acquiring lattice regions by dividing the modified design data by an optional combination of a lattice of an optional size and an optional lattice interval, deriving a numerical value indicative of a design characteristic of the modified design data with respect to each of the lattice regions and preparing a modified design characteristic item data; and comparing the modified design characteristic item data with the defect occurrence rule to calculate a probability of a failure, which is a defect causing probability.

In the fourteenth aspect, the defect occurrence rule is preferably prepared by the semiconductor defect analyzing method according to the sixth or seventh aspect.

According to a fifteenth aspect of the present invention, there is provided a computer readable recorded medium in which a program for causing a computer to execute a semiconductor design data modifying method, the semiconductor design data modifying method comprising the steps of: extracting an inspected object region from a design data of a semiconductor device and preparing first lattice regions by dividing the inspected object region into lattices of an optional first size, the inspected object region serving as an object to be inspected, and, the optional first size being given as a first parameter; preparing a first design characteristic item data by deriving a numerical value indicative of a design characteristic of the design data every one of the first lattice regions; preparing a first characteristic classification data by classifying the design characteristic item data into a desired number of groups; extracting the first lattice regions at random from the first characteristic classification data at a constant sampling rate with respect to the number of the lattice regions belonging to the groups; obtaining a defect inspection data concerning an actual defect and a degree of the defect by inspecting a pattern of the first lattice regions, the actual defect and the degree of the defect being extracted at the sampling rate; acquiring second lattice regions by dividing the inspected object region in the design data into lattices of a second size on the basis of the defect inspection data concerning the actual defect and the degree of the defect of processed patterns so that a place causing the defect is arranged at the center thereof on the basis of the design data and preparing a second design characteristic item data by deriving a numerical value indicative of a design characteristic of the design data every one of the second lattice regions, the second size being given as a second parameter; collecting a value of a first process result corresponding to a pattern in the second lattice regions on the basis of a data on an observable process result relating to a processing of the pattern based on the design data; acquiring third lattice regions by dividing the inspected object region into lattices of the second size on the basis of the defect inspection data so that a non-defective place processed on the basis of the defect inspection data is arranged at the center thereof and preparing a third design characteristic item data by derive a numerical value indicative of a design characteristic of the design data every one of the third lattice regions; collecting a value of a second process result corresponding to a pattern in the third lattice regions from a data on the observable process result; preparing a defect occurrence rule by acquiring a first correlation between the defect and the degree of the defect and a combination of the second design characteristic item data and the value of the first process result and by acquiring a second correlation between the defect and the degree of the defect and a combination of the third design characteristic item data and the value of the second process result; extracting a pattern capable of causing the defect from the design data on the basis of the defect occurrence rule; modifying the design data with respect to the extracted pattern to output the modified design data; obtaining fourth lattice regions by dividing the modified design data by an optional combination of the lattice of the third size and an optional lattice interval, the optional third size being given as a third parameter, and, the optional lattice interval being given as a fourth parameter; preparing a fourth design characteristic item data by deriving a numerical value indicative of a design characteristic of the modified design data with respect to each of the fourth lattice regions; and calculate a probability of a failure, which is a defect causing probability, by comparing the fourth design characteristic item data with the defect occurrence rule.

The recorded medium according to the fifteenth aspect preferably further comprises a step of repeating the steps from the step of extracting the pattern capable of causing the defect to the step of calculating the probability of the failure while comparing the probability of the failure with a desired threshold until the probability of the failure reaches the desired threshold or until the probability of the failure reaches the minimum value.

In the above described aspects, the comparison of a data on a defect shape of a processed pattern with an ideal shape is preferably carried out using an image acquired by an electron microscope or an image acquired by an optical technique.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, some preferred embodiments of the present invention will be described below. Furthermore, the same reference numbers are given to the same portions in the following respective figures, and the descriptions thereof are appropriately omitted.

Figure 1:
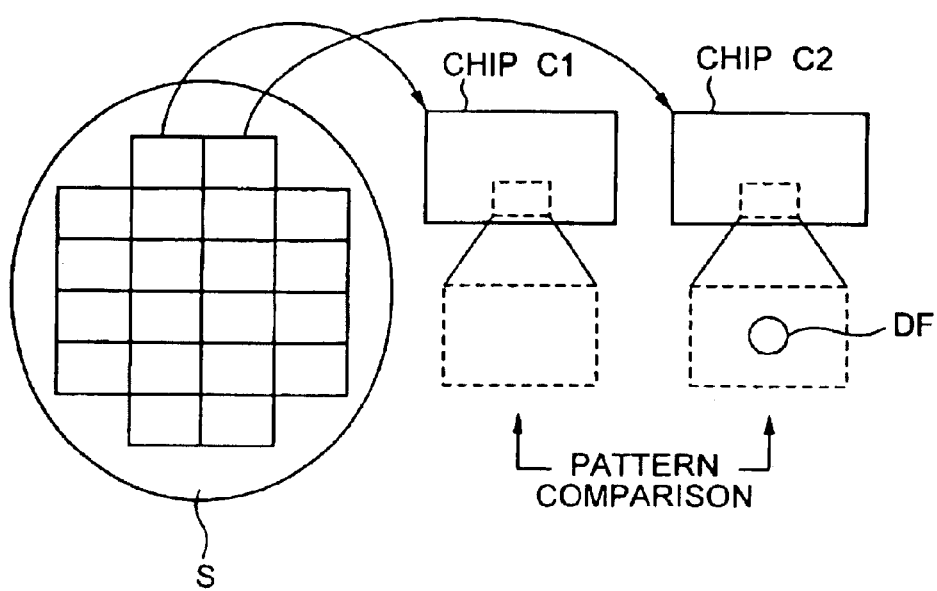
FIG. 1 is a schematic diagram for explaining the prior art.
Figure 2:
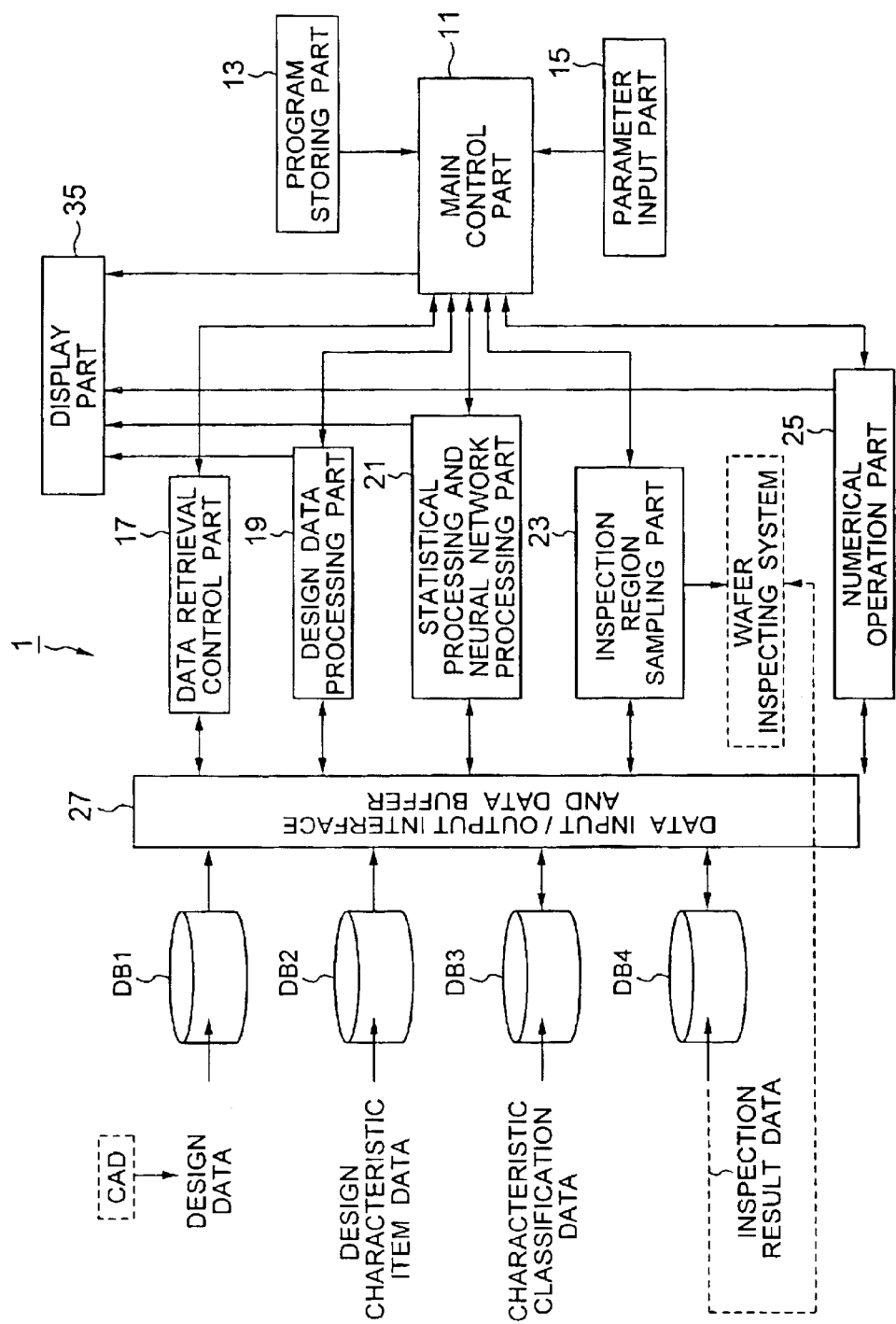
FIG. 2 is a block diagram showing a preferred embodiment of a semiconductor inspecting system according to the present invention.

(1) Preferred Embodiments of Semiconductor Inspecting System and Semiconductor Inspecting Method FIG. 2 is a block diagram showing a preferred embodiment of a semiconductor inspecting system according to the present invention. A substrate inspecting system 1 shown in this figure comprises a program storing part 13, a parameter input part 15, a main control part 11, a display part 35, a data retrieval control part 17, a design data processing part 19, a statistical processing and neural network processing part 21, an inspection region sampling part 23, a numerical operation part 25, a data input/output interface and data buffer 27, and various data bases DB1 through DB4.

The program storing part 13 is designed to store therein a program which describes the sequence of the procedure for controlling various processing parts in order to execute a preferred embodiment of a semiconductor inspecting method according to the present invention which will be described later. This program is loaded on the main control part 11.

In the parameter input part 15, parameters required to carry out a processing are stored. Examples of the parameters include the name of a product to be processed, the size of a lattice region, a sampling rate and so forth.

The main control part 11 is designed to serially read the parameters required to carry out the processing, and to supply command signals to the respective processing parts, in accordance with the program which is loaded from the program storing part 13.

The display part 35 is designed to display various data, such as the number of defects in the whole wafer, which are the final output results of this system. The display part 35 also serves as an input part so as to be able to directly assign information data required to carry out the processing when the information data are intended to be selected.

The data retrieval control part 17 is designed to receive command signals from the main control part to retrieve required data from the respective data bases via the data input/output interface and data buffer 27 to cause the data buffer to temporarily hold the data. After the holding of the data is terminated, the data retrieval control part 17 supplies a termination signal to the main control part 11. When the processed data are intended to be stored in the respective data bases, the data retrieval control part 17 carries out the storage via the data input/output interface and data buffer 27. This point is the same in other preferred embodiments which will be described later.

The design data processing part 19 receives a design data, which has been retrieved in the data base DB1 to be stored in the data buffer, to divide an inspection region into lattice regions of a desired size to derive numerical values indicative of the respective items of a design characteristic item data, which has been stored in the data base DB2, with respect to the divided lattice regions to store the results as a characteristic classification data in the data base DB3. In this preferred embodiment, the design data processing part 19 constitutes a design characteristic item data preparing part.

The statistical processing and neural network processing part 21 is designed to acquire the numerical data of all of the characteristic items in all of the divided lattice regions from the characteristic classification data, which has been stored in the data base DB3, to classify the respective lattice regions into a desired number of groups to add class numbers (group ID) to the respective groups to store them as a characteristic classification data in the data base DB3 again. In this preferred embodiment, the statistical processing and neural network processing part 21 constitutes a characteristic classification data preparing part.

The inspection region sampling part 23 is designed to receive the sampling rate from the parameter input part 15 via the main control part 11 to select lattice regions at random from the respective groups, which have been classified by the statistical processing and neural network processing part 21, in accordance with the sampling rate to supply a data on the selected regions to the outside wafer inspecting system.

The results of wafer inspection are stored in the data base from the wafer inspecting system as an inspection result data.

The numerical operation part 25 is designed to retrieve a data on the presence of defects from the inspection result data, which has been stored in the data base DB4, and to retrieve the characteristic classification data from the data base DB3, to calculate the number of defects in the whole wafer on the basis of the retrieved data and the sampling rate, which has been inputted from the parameter input part 15 via the main control part 11, to output the calculated number of defects.

Referring to the accompanying drawings, as a preferred embodiment of a substrate inspecting method according to the present invention, the operation of the substrate inspecting system 1 shown in FIG. 2 will be described below.

Figure 3:
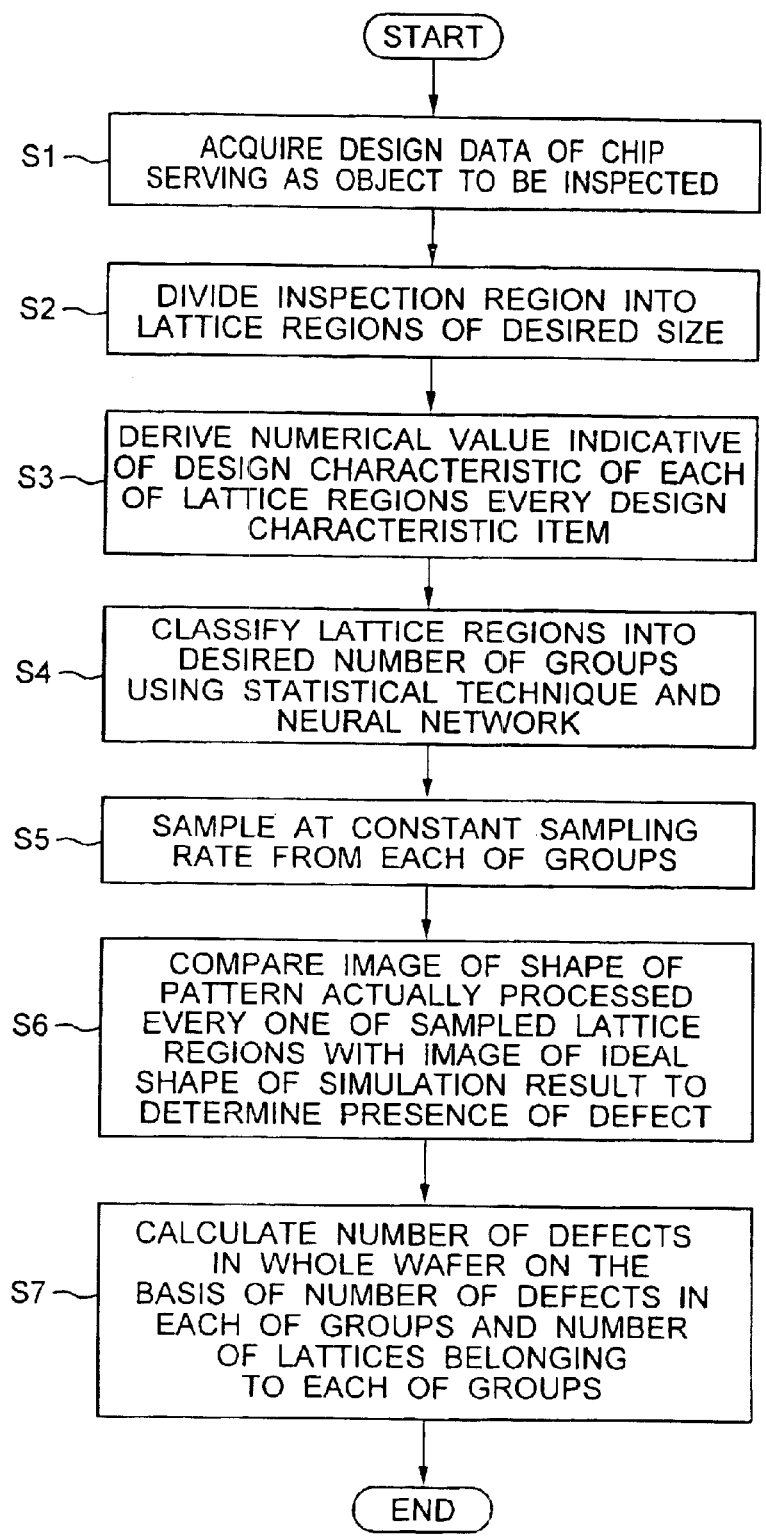
FIG. 3 is a flow chart for explaining a preferred embodiment of a semiconductor inspecting method according to the present invention.

FIG. 3 is a flow chart for explaining a substrate inspecting method in this preferred embodiment.

First, a design data about a chip serving as an object to be inspected is prepared (step S1). An example of a design data is shown on the right side in FIG. 4. This figure shows four regions DM1 through DM4. A case where the region DM1 is selected as an inspection region from these regions will be described below.

Figure 4:
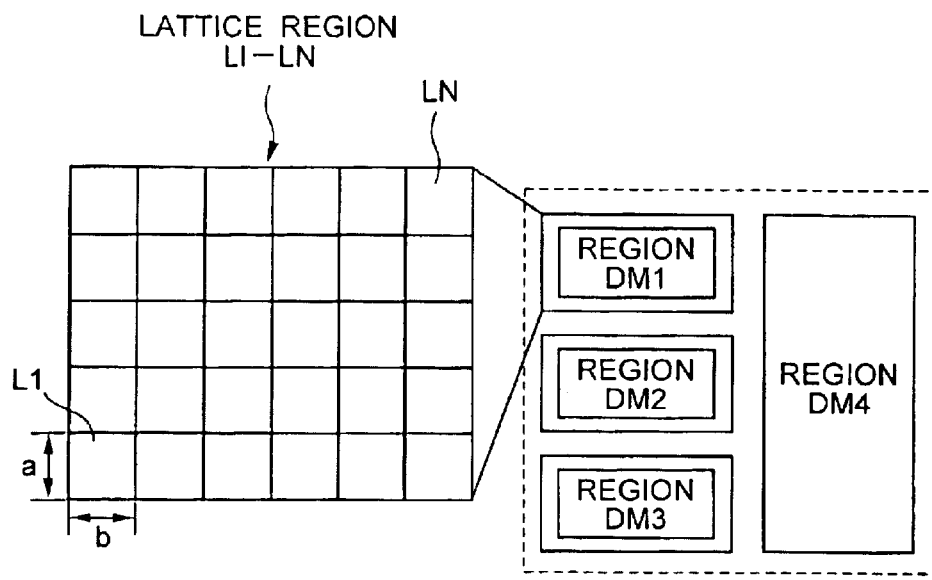
FIG. 4 is a schematic diagram for explaining a lattice division in the method shown in FIG. 3.

The design data processing part 19 divides the inspection region DM1 into lattices of an optional size, e.g., N lattices L1 through LN having a size of a×b as shown on the left side in FIG. 4 (step S2). Then, the design data processing part 19 retrieves the design characteristic item data, which is indicative of the characteristic of the design and which is a data on items capable of being expressed as numerical values, from the data base DB2 to derive numerical values, which are indicative of the respective design characteristics in the lattice region L1, every design characteristic item (step S3). The design characteristic items include the number of patterns, a minimum design dimension, a minimum space dimension, a pattern density PD, a pattern occupying rate PCR to the area of the lattice, a center of gravity vector CGV, a symmetry with respect to X-axis (XS), a symmetry with respect to Y-axis (YS), and a symmetry with respect to a point (PS).

Figure 5:
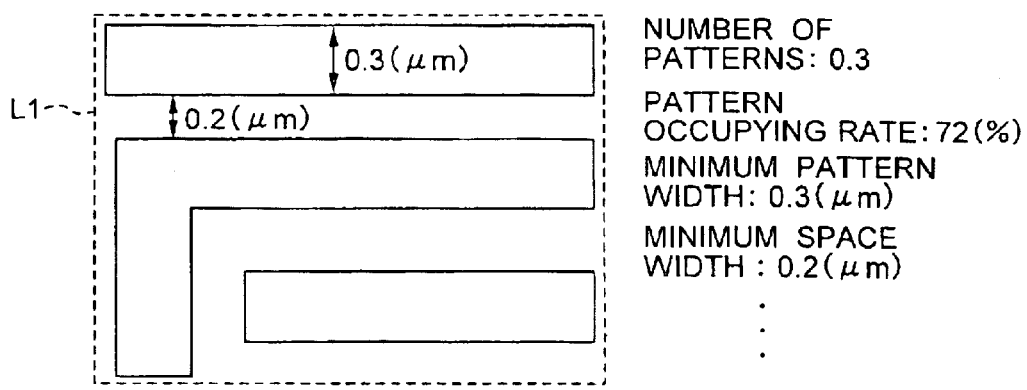
FIG. 5 is a schematic diagram for explaining a design characteristic item data.

FIG. 5 shows an example of numerical values indicative of design characteristics with respect to the lattice region L1 shown in FIG. 4($a$). In the example of numerical values indicative of design characteristics with respect to the lattice region L1 shown in the figure, the number of patterns is 3, the pattern occupying rate is 72%, the minimum pattern width is 0.3 $\mu$m, and the minimum space width is 0.2 $\mu$m.

Assuming that the area of the lattice is SL and the whole area of the patterns in the lattice is SP, the pattern density PD is expressed by PD=SP/SL, and the pattern occupying rate PCR to the area of the lattice is expressed by PCR=PD×100. The center of gravity vector CGV is obtained by deriving the center of gravity and the area of every graphic in the lattice region, preparing a polygon, the vertexes of which are the centers of gravity of the respective graphics, setting the mass density of the polygon as the area of each graphic, calculating the center of gravity assuming that the patterns are biased at the vertexes, and expressing the calculated center of gravity by a vector using the center of the lattice as the origin. The X-axis symmetry, the Y-axis symmetry and the point symmetry (XS, YS and PS) are expressed by the ratio of the area of a region, in which graphics before and after symmetric movement overlap with each other, to the area of a graphic before symmetric movement.

The design data processing part 19 causes the numerical design characteristic item data serving as a characteristic classification data to be stored in the data base DB3.

Figure 6:
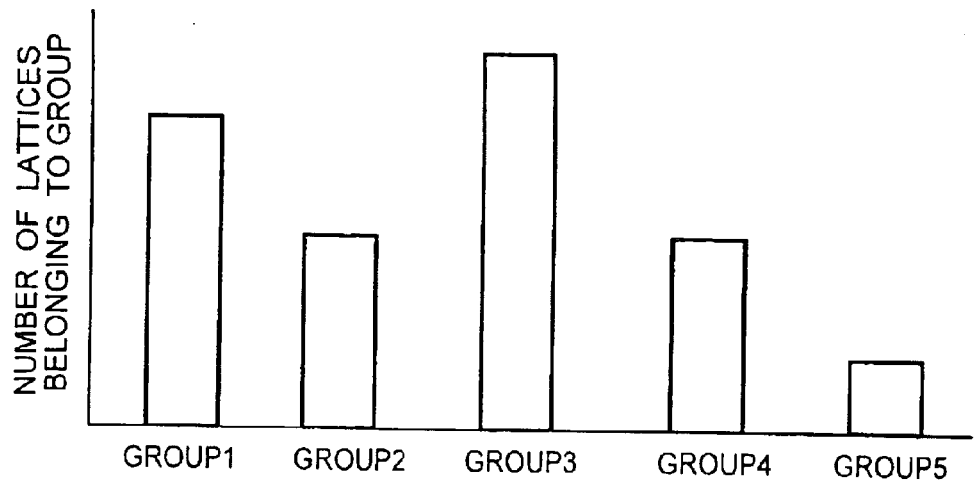
FIG. 6 is a graph showing an example of classification and a histogram of the classification when lattices are classified by a pattern occupying rate, which is one of design characteristics, in the inspecting method shown in FIG. 3.

Then, the statistical processing and neural network processing part 21 retrieves the characteristic classification data from the data base DB3, and classifies the respective lattice regions into a desired number of groups using a statistical technique and a neural network (step S4). As an example of a statistical technique, a decision tree is used. FIG. 6 shows an example of this classification when the lattice regions are classified by the pattern occupying rate. This figure shows an example where the classification is carried out with respect to a certain characteristic classification data by the pattern occupying rate. This classification is not only carried out with respect to a single design characteristic, but it is also carried out with respect to the combination of a plurality of design characteristic. This classification is carried out so that lattice regions having characteristic values approximating to each other are included in the same group. In the example of FIG. 6, the lattice regions are classified every time the pattern occupying rate increases by 20%, so that the respective lattice regions are classified into five groups (group 1 through group 5). The statistical processing and neural network processing part 21 stores the classified results in the contents of the data base DB3 as a characteristic classification data.

Then, the inspection region sampling part 23 retrieves the characteristic classification data from the data base DB3, and samples lattices from each of the groups at random at a constant rate with respect to the number of lattices belonging to the group (step S5). The results of the sampling are supplied to the outside wafer inspecting system.

Figure 7:
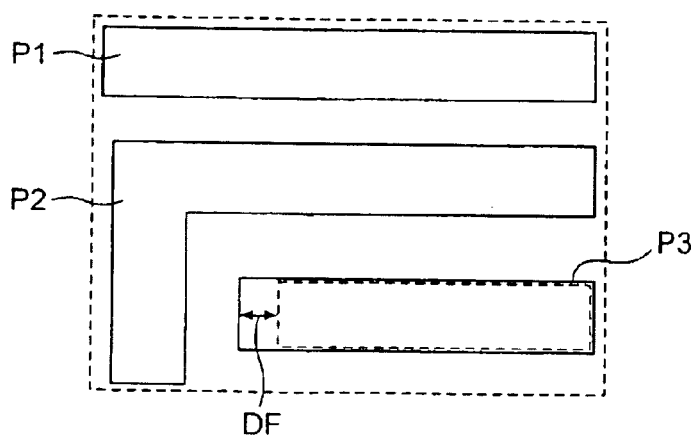
FIG. 7 is a schematic diagram for explaining the comparison of the image of a processed pattern with the image of an ideal shape, in the inspecting method shown in FIG. 3.

The wafer inspecting system compares the image of the processed pattern with the image of an ideal shape every sampled lattice region with respect to the wafer produced by the semiconductor process (step S6). An example of such comparison of images is shown in the schematic diagram of FIG. 7. In the drawing, with respect to patterns P1 and P2, the processed patterns are coincident with the ideal shapes. However, with respect to a pattern P3, the size of the processed pattern in the lateral direction in the figure is greater than that of the ideal shape (broken line), and a defect DF occurs in this portion. The image may be an image acquired by an electron microscope or an optical technique. The ideal shape means a shape based on a design data and the simulation result based thereon. The presence of defects serving as the results of comparison becomes the difference between the processed pattern and the ideal shape, i.e., the length of DF in the example of FIG. 7. The wafer inspecting system supplies information on the presence and degree of defects, as an inspection result data, to the data base DB4 of the substrate inspecting system 1.

Finally, the numerical operation part 25 retrieves the characteristic classification data from the data base DB3 and the inspection result data from the data base DB4, to calculate the total number of lattices, which are regarded as lattices having defects, every group on the basis of the number of lattices having defects in each group, the number of lattices belonging to the group and the sampling rate with respect to the group, and to calculate the sum total of the calculated total numbers of lattices in all of the groups which are regarded as groups having defects. This sum total is the number of lattices, which are regarded as lattices having defects, in the whole inspection region DM1 shown in, e.g., FIG. 4. If the number of defects regarded as defects included in the lattices is considered every group, the number of defects in the whole region DM1 is calculated.

Figure 8:
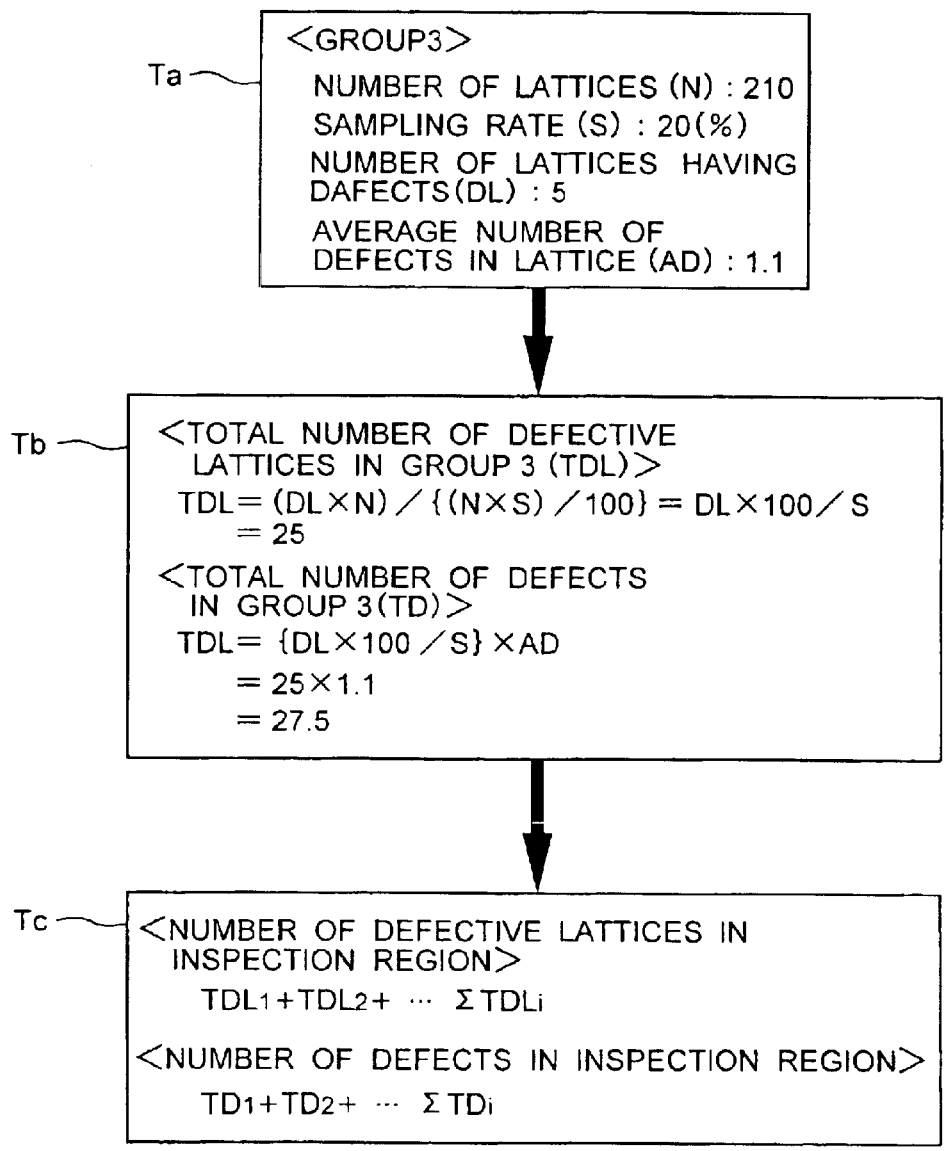
FIG. 8 is a flow chart showing a method for calculating the total number of lattices including defects and the total number of defects, in the inspecting method shown in FIG. 3.

An example of such calculation of the number of defective lattices and the number of defects is shown in FIG. 8. For example, as shown in Ta of FIG. 8, if a certain group 3 is taken, it is assumed that the number (N) of lattices in the group 3 is 210, the sampling rate (S) is 20%, the number (DL) of lattices having defects is 5, and the average number (AD) of defects in the lattice is 1.1. Then, as shown in Tb, the total number (TDL) of defective lattices in the group 3 is TDL=25, and the total number (TD) of defects is TD=27.5. Moreover, assuming that the sum total of groups is i, the number of defective lattices in the whole inspection region to which the group 3 belongs is TDL 1+TDL2+ . . . ΣTDLi, and the number of defects in the inspection region is TD1+TD2+ . . . ΣTDi.

According to the defect inspecting method in this preferred embodiment, in a case where defects generated in accordance with the characteristics of the design are quantified, the number of defects can be more precisely presumed than the conventional method for selecting an object to be inspected from the divided regions at random. In addition, since the same pattern can be uniformly inspected by sampling every classification, the inspection efficiency can be improved. Moreover, since the ideal shape based on the simulation result can be used for comparing the processed shape with the ideal shape, it is possible to further improve the inspection speed than the conventional method for comparing the images of the same regions in chips.

Figure 9:
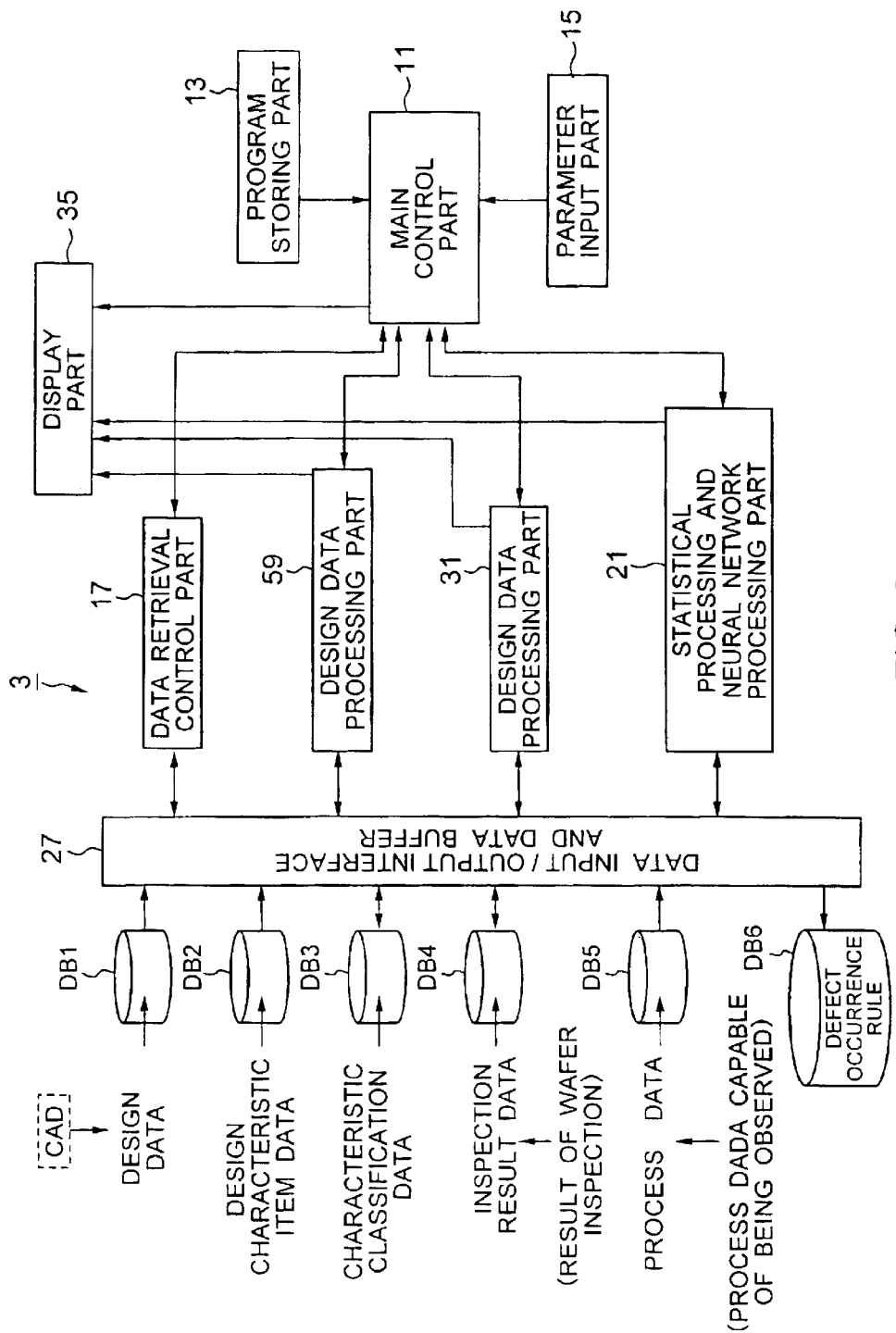
FIG. 9 is a block diagram showing the first preferred embodiment of a semiconductor defect analyzing system according to the present invention.

(2) Preferred Embodiments of Semiconductor Defect Analyzing System and Semiconductor Analyzing Method FIG. 9 is a block diagram showing the first preferred embodiment of a semiconductor defect analyzing system according to the present invention. The semiconductor defect analyzing system 3 shown in this figure comprises a main control part 11, a program storing part 13, a parameter input part 15, a display part 35, a data retrieval control part 17, a design data processing part 59, a statistical processing and neural network processing part 21, a data input/output interface and data buffer 27, and data bases DB1 through DB4, and further comprises a process data processing part 31 and data bases DB5 and DB6.

The data base DB5 is designed to store therein process data capable of being observed after a process processing. Specifically, the process data include the thickness of a material formed below the processed pattern, the thickness of a processed material, and so forth.

In this preferred embodiment, the design data processing part 59 is designed to retrieve the coordinates of the position of a defect on the basis of the inspection result data which has been stored in the data base DB4, and retrieve a design data of a product serving as an object to be inspected from the data base DB1 and a character classification data from the data base DB3. In addition, the design data processing part 59 to receive parameters of a lattice size from the parameter input part 15 via the main control part 11, extract a lattice region from the design data so that the defect is arranged at the center thereof, and derive numerical values indicative of the design characteristic every design characteristic item data with respect to the extracted lattice region, to store the results in the data base DB4 as a characteristic classification data. At this time, if a plurality of lattice sizes are inputted from the parameter input part 15, the above described processing is repeated every size. On the other hand, the design data processing part 59 is also designed to extract the above described lattice region and derive numerical values of design characteristics, with respect to a region in which no defect has been detected. If a plurality of lattice sizes are inputted with respect to the region in which no defect has been detected, the design data processing part 59 repeats the above described processing every size similar to the processing when no defect has been detected.

The process data processing part 31 is designed to retrieve a characteristic classification data from the data base DB3 and process data corresponding to the lattice region in the characteristic classification data from the data base DB5. At this time, the process data processing part 31 is designed to equalize a process data and so forth so that the region, in which the process data has been acquired, corresponds to the lattice region, if necessary. The processed data are stored in the data base DB3 as a characteristic classification data.

The statistical processing and neural network processing part 21 is designed to retrieve the characteristic classification data from the data base DB3, and retrieve a process data corresponding to design characteristics every lattice region from the data base DB5. Moreover, the statistical processing and neural network processing part 21 is designed to use a statistical processing and a neural network to analyze the characteristic classification data and the process data to prepare the relationship between the combination of the design characteristics and the process data, and the rate of occurrence of defects, i.e., a defect occurrence rule. The prepared defect occurrence rule is stored in the data base DB6. The statistical processing and neural network processing part 21 constitutes a defect occurrence rule preparing part in this preferred embodiment.

Referring to the accompanying drawings, as a preferred embodiment of a semiconductor defect analyzing method according to the present invention, the operation of the semiconductor defect analyzing system 3 shown in FIG. 9 will be described below in more detail.

Figure 10:
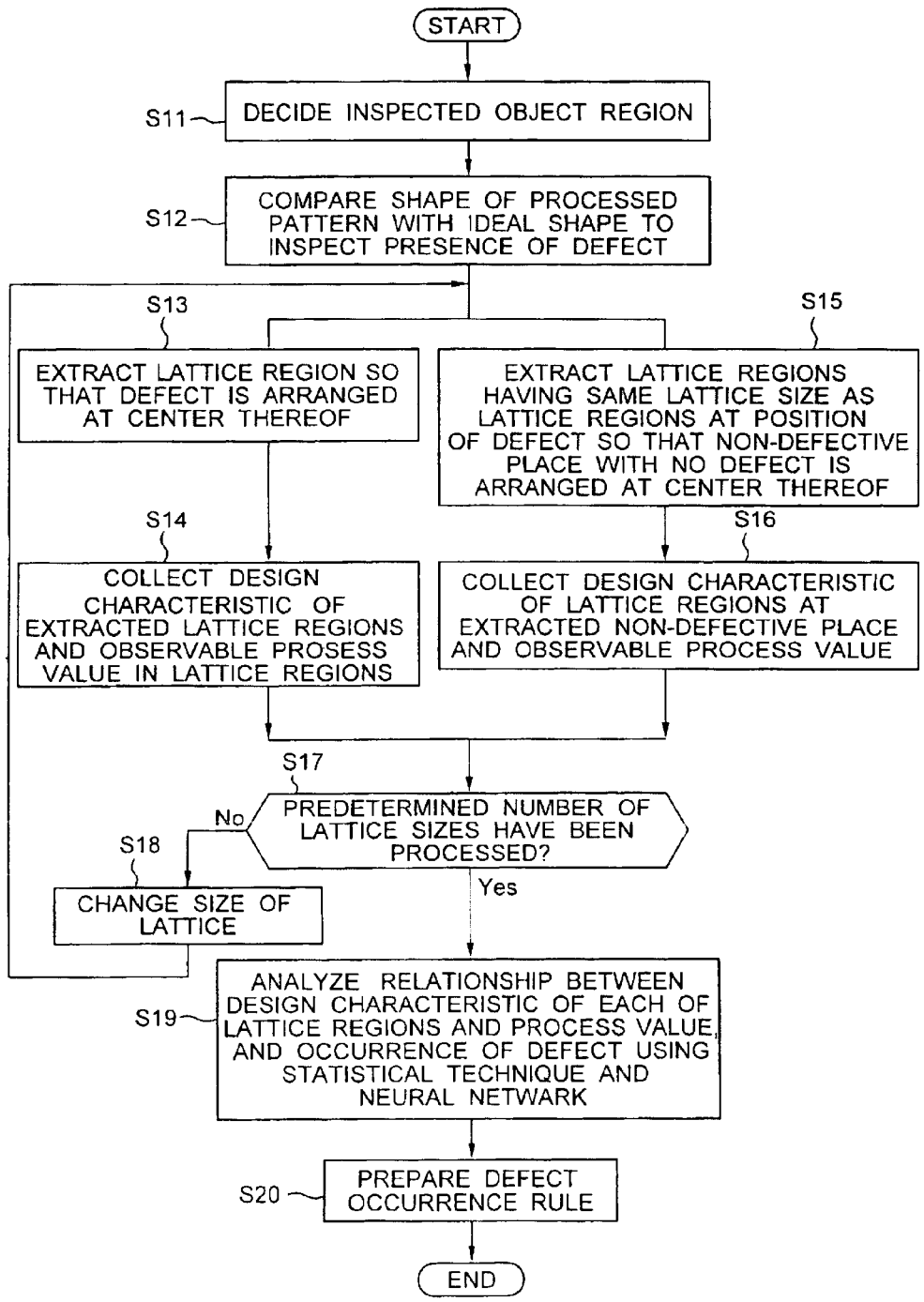
FIG. 10 is a flow chart for explaining the first preferred embodiment of a semiconductor defect analyzing method according to the present invention.

FIG. 10 is a flow chart for explaining a semiconductor analyzing method according to the present invention.

First, a region serving as an object to be inspected is decided (step S11).

Then, the outside wafer inspecting system is used for comparing the image of the pattern shape of a processed wafer in an inspected object region with the image of an ideal shape to detect the presence and degree of defects (step S12). The processing procedure for carrying out the comparison of the images is the same as the procedure described in the above described preferred embodiment of the substrate inspection method. The detected results are stored in the data base DB4 as an inspection result data.

Then, the design data processing part 59 receives parameters concerning the lattice size from the parameter input part 15 via the main control part 11, and extracts a lattice region having an optional size from a design data so that the detected defect is arranged at the center thereof (step S13). Then, the design data processing part 59 derives the numerical values of design characteristics in the extracted lattice region every design characteristic item to store the numerical values in the data base DB3 as a characteristic classification data. On the other hand, the design data processing part 59 extracts a lattice region, which has the same size as that of the lattice, at the center of which the defect is arranged, from the design data so that a non-defective place having no defect is arranged at the center thereof, by a procedure which is substantially the same as the procedure for preparing the characteristic classification data with respect to the defect place (step S15), and derives the numerical values of the respective design characteristics to store them in the data base DB3 as a characteristic classification data.

Then, the process data processing part 31 extracts the characteristic classification data which has been prepared with respect to the lattice region about the defect place, and collects a process data relating to the design characteristics in the respective lattice regions from the data base DB5 (step S14). Similarly, the process data processing part 31 extracts the characteristic classification data which has been prepared with respect to the lattice region about the non-defective place, and collects a process data relating to the design characteristics in the respective lattice regions from the data base DB5 (step S16).

If a predetermined number of lattice sizes are given from the parameter input part 15 (step S17), the design data processing part 59 and the process data processing part 31 change a predetermined number of lattice sizes (step S18), and repeat the above described processing (steps S13 through S16). After the processing for a single lattice size is terminated if the single lattice size is given and after the processing for a plurality of lattice sizes is terminated if the plurality of lattice sizes are given, the process data processing part 31 stores a data indicative of the presence of defects, and the degree of the difference between the processed shape and the ideal shape when defects exist, together with the values of the process results, in the data base DB3 as a characteristic classification data every lattice region having the single lattice size or every lattice region having the plurality of lattice regions.

Then, the statistical processing and neural network processing part 21 extracts the characteristic classification data including these information to analyze the extracted characteristic classification data using the statistical processing and the neural network (step S19), and stores the respective design characteristics causing defects, the process results relating thereto, and the relationship between the presence of defects and the degree of defects, in the data base DB6 as a defect occurrence rule (step S20).

According to the semiconductor defect inspecting method in this preferred embodiment, it is not only clarified what combination of the design characteristics and information on process results causes defects, but the rate (probability) of the occurrence is also clarified. For example, there is provided a defect occurrence rule wherein "82 (%) of a lattice region causes defects when the lattice region has characteristics that the lattice region has a size of 50×50 ($\mu$m), the pattern occupying rate is in the range of from 20 to 40 (%), the minimum space with is 1 ($\mu$m) and the thickness of the underlayer is in the range of from 0.28 to 0.29 ($\mu$m)". A plurality of such defect occurrence rules are prepared.

Figure 11:
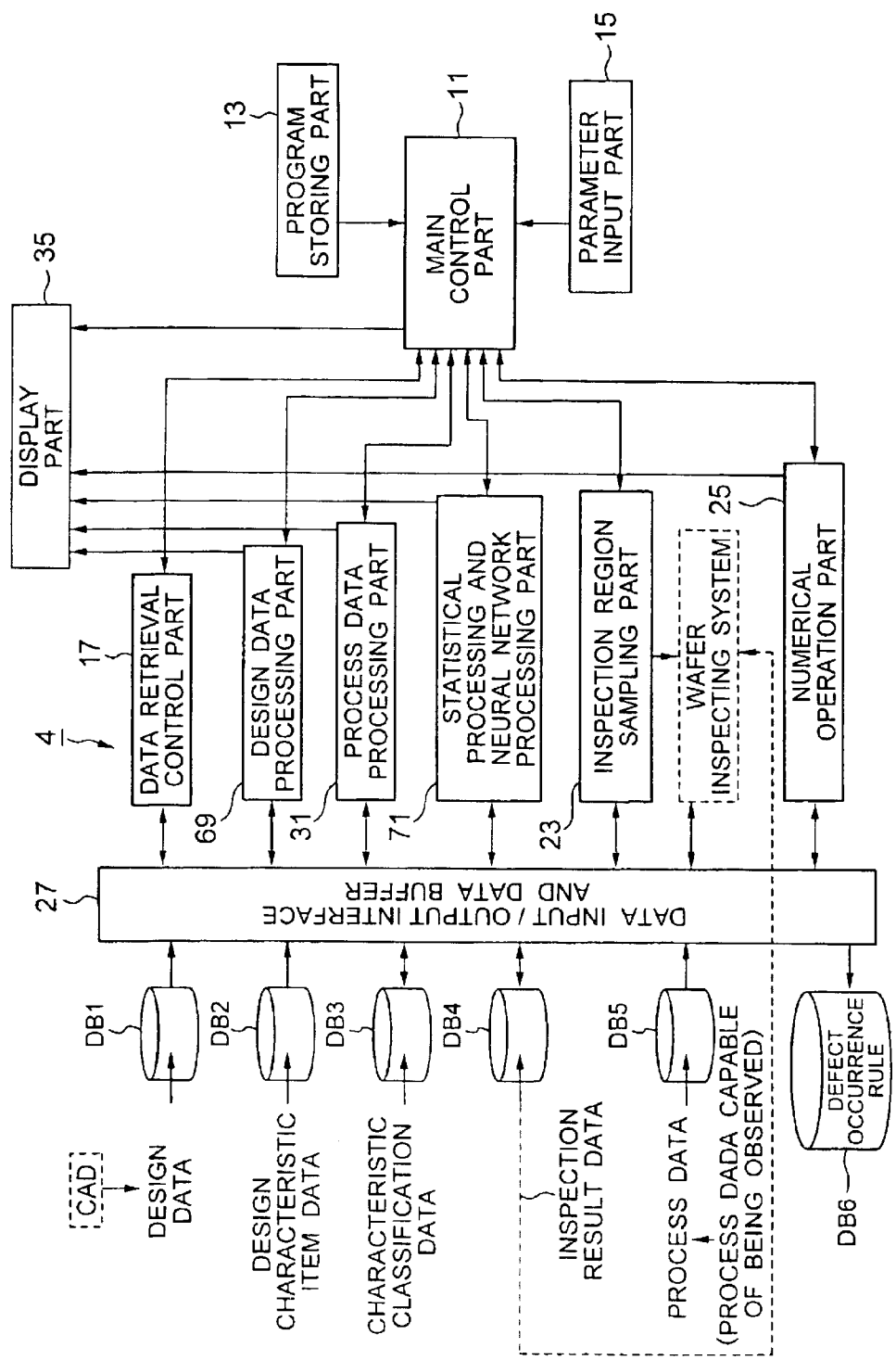
FIG. 11 is a block diagram showing the second preferred embodiment of a semiconductor defect analyzing system according to the present invention.

FIG. 11 is a block diagram showing the second preferred embodiment of a semiconductor defect analyzing system according to the present invention. As can be clearly from the comparison FIG. 2 with FIG. 9, the semiconductor defect analyzing system 4 in this preferred embodiment comprises components which are substantially the same as all of components of the above described substrate inspecting system 1 and semiconductor defect analyzing system 3, and is designed to continuously execute all of the above described functions of these systems. In this preferred embodiment, the design data processing part 69 constitutes a design characteristic item data preparing part and a design data processing part 69, and the statistic processing and neural network processing part 71 constitutes a characteristic classification data preparing and a defect occurrence rule preparing part. Furthermore, the parameter input part 15 inputs first and second lattice sizes to the design data processing part 69 via the main control part 11, and supplies parameters of a sampling rate to the inspection region sampling part 23 and the numerical operation part 25 via the main control part 11.

Referring to the accompanying drawing, as the second preferred embodiment of a semiconductor defect analyzing method according to the present invention, the operation of the semiconductor defect analyzing system 4 shown in FIG. 11 will be described below in more detail.

Figure 12:
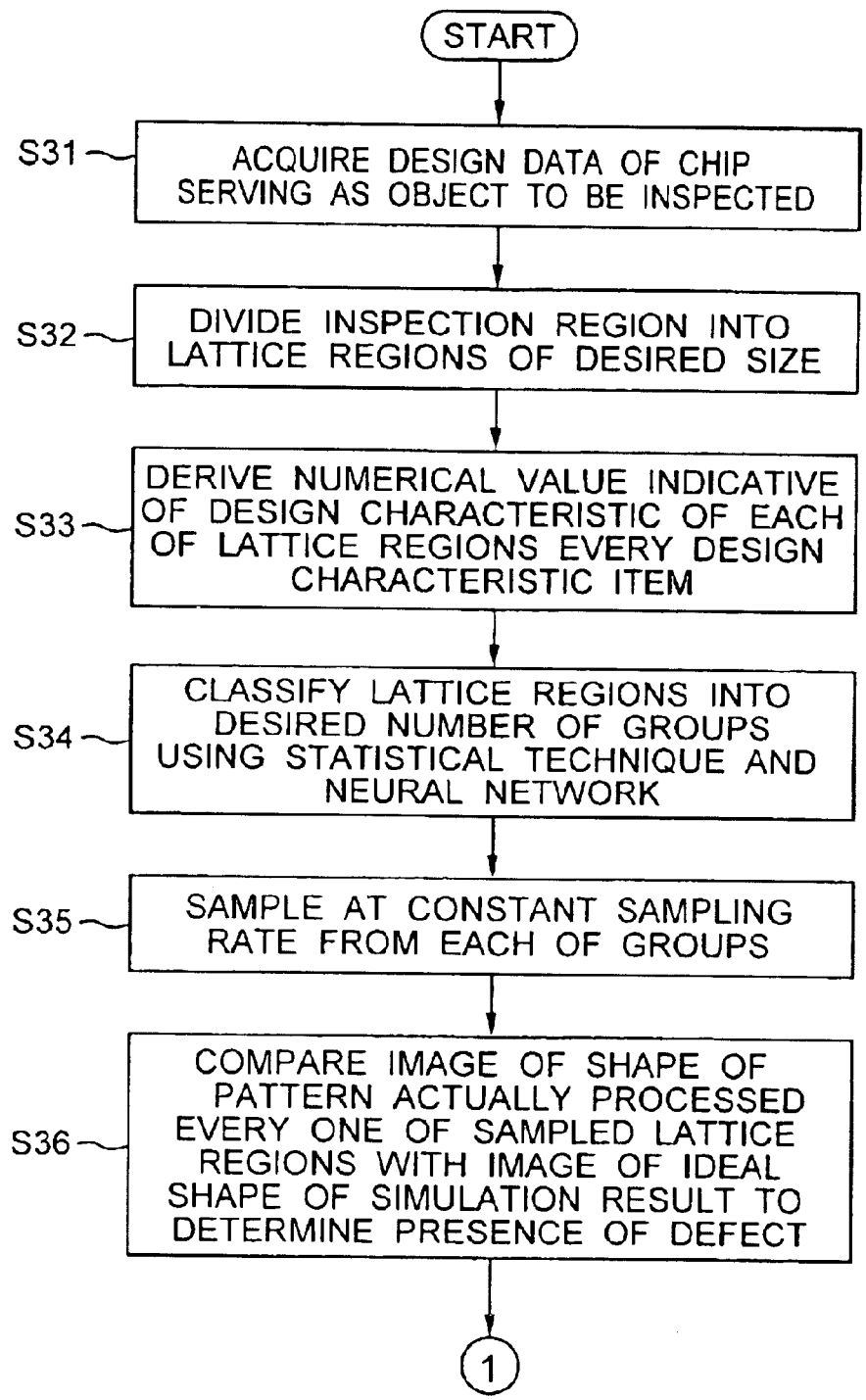
FIGS. 12 and 13 are flow charts for explaining the second preferred embodiment of a semiconductor defect analyzing method according to the present invention.
Figure 13:
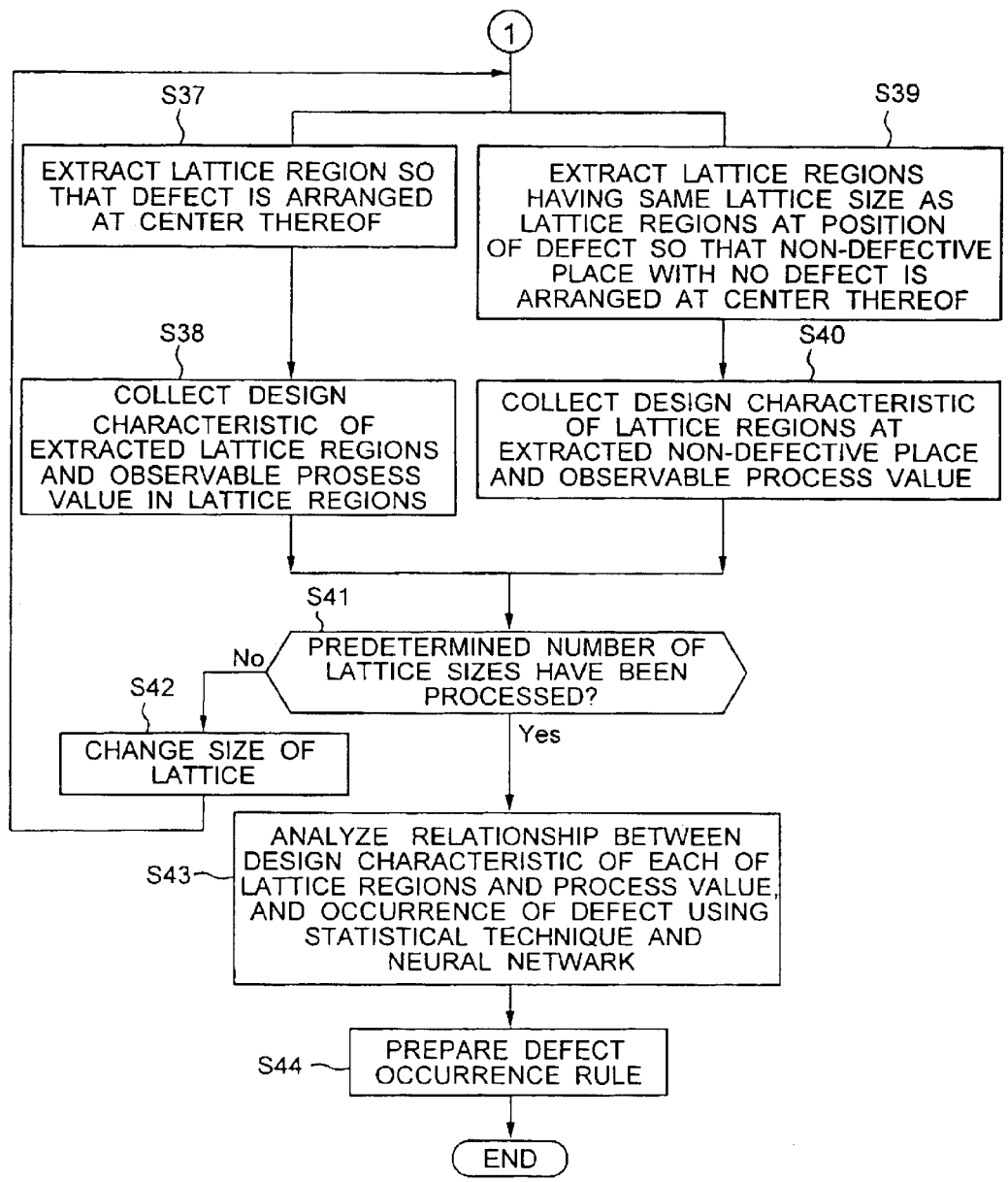

FIGS. 12 and 13 are flow charts for explaining a substrate defect analyzing method in this preferred embodiment.

First, as shown in FIG. 12, a design data of a chip serving as an object to be inspected are prepared as the data base DB1 (step S31).

Then, the design data processing part 69 divides an inspection region DM1 into lattices of an optional size (first size) (step S32). Then, the design data processing part 69 retrieves a design characteristic item data from the data base DB2, and derives the numerical values of the respective design characteristics in the lattice region (first lattice region) every design characteristic item (step S33).

The design data processing part 69 stores the numerical design characteristic items in the data base DB3 as a characteristic classification data (first characteristic classification data).

Then, the statistical processing and neural network processing part 71 retrieves the first characteristic classification data from the data base DB1, and classifies the respective lattice regions into a desired number of groups using the statistical technique and the neural network (step S34). As an example of the statistical technique, a decision tree is used. This classification is not only carried out with respect to a single design characteristic, but it is also carried out with respect to the combination of a plurality of design characteristic. This classification is carried out so that lattice regions having characteristic values approximating to each other are included in the same group. The statistical processing and neural network processing part 71 stores the classified results in the contents of the data base DB3 as a second characteristic classification data.

Then, the inspection region sampling part 23 retrieves the second characteristic classification data from the data base DB3, and samples lattices from each of the groups at random at a constant rate with respect to the number of lattices belonging to the group (step S36). The results of the sampling are supplied to the outside wafer inspecting system (step S36).

The wafer inspecting system supplies information on the presence and degree of defects to the data base DB4 of the semiconductor defect analyzing system 4 as an inspection result data.

Referring to FIG. 12 again, the design data processing part 69 then receives parameters concerning the lattice size (second size) from the parameter input part 15, and extracts a lattice region (second lattice region) having the second size from a design data so that detected defect is arranged at the center thereof (step S37). Then, the design data processing part 69 derives the numerical values of design characteristics in the extracted lattice region every design characteristic item (second design characteristic item) to store the numerical values in the data base DB3 as a third characteristic classification data. On the other hand, the design data processing part 69 extracts a lattice region, which has the same size as that of the lattice, at the center of which the defect is arranged, from the design data so that a non-defective place having no defect is arranged at the center thereof, by a procedure which is substantially the same as the above described procedure (step S39), and derives the numerical values (third design characteristic item) of the respective design characteristics to store them in the data base DB3 as a fourth characteristic classification data.

Then, the process data processing part 31 extracts the third characteristic classification data which has been prepared with respect to the lattice region about the defect place, and collects a process data (the value of the first process result) relating to the design characteristics in the respective lattice regions from the data base DB5 (step S38). Similarly, the process data processing part 31 extracts the fourth characteristic classification data which has been prepared with respect to the lattice region about the non-defective place, and collects a process data (the value of the second process result) relating to the design characteristics in the respective lattice regions from the data base DB5 (step S40).

If a predetermined number of lattice sizes (second sizes) are given from the parameter input part 15 (step S41), the design data processing part 69 and the process data processing part 31 change a predetermined number of lattice sizes (step S42), and repeat the above described processing (steps S37 through S40). After the processing for a single lattice size is terminated if the single lattice size is given and after the processing for a plurality of lattice sizes is terminated if the plurality of lattice sizes are given, the process data processing part 31 stores a data indicative of the presence of defects, and the degree of the difference between the processed shape and the ideal shape when defects exist, together with the values of the process results, in the data base DB3 as a fifth characteristic classification data every lattice region or every lattice region having each of the sizes.

Then, the statistical processing and neural network processing part 71 extracts the fifth characteristic classification data including these information from the data base DB3 to analyze the extracted fifth characteristic classification data using the statistical processing and the neural network (step S43), and stores the respective design characteristics causing defects, the process results relating thereto, and the relationship between the presence of defects and the degree of defects, in the data base DB6 as a defect occurrence rule (step S44).

According to the semiconductor defect analyzing method in this preferred embodiment, since the above described semiconductor inspecting method and semiconductor defect analyzing method are continuously carried out, similar patterns can be uniformly and rapidly inspected, and since semiconductor defects are analyzed on the basis of the inspected results, a precise defect occurrence rule can be provided with a high throughput.

Figure 14:
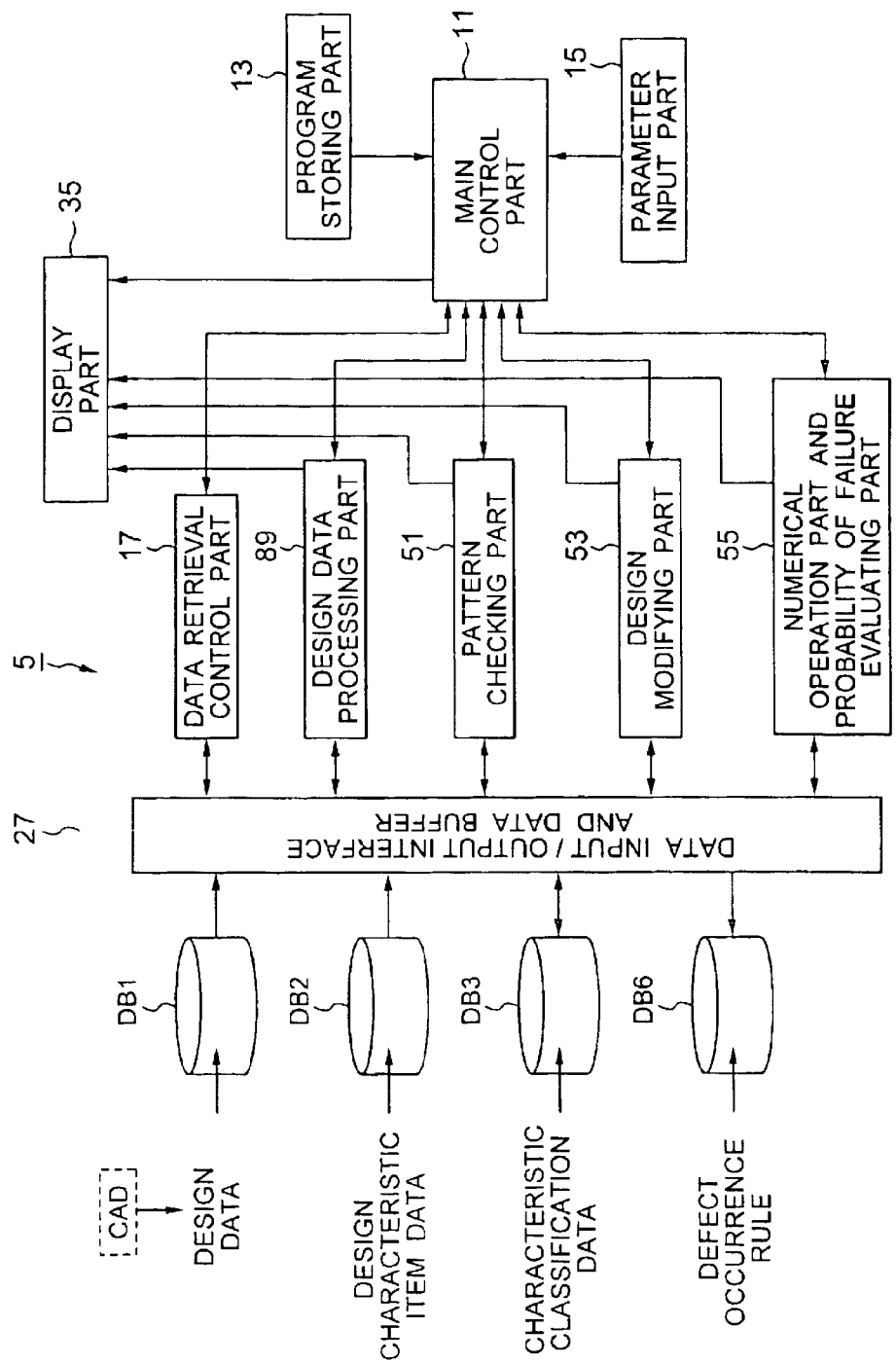
FIG. 14 is a block diagram showing the first preferred embodiment of a semiconductor design data modifying system according to the present invention.

(3) Preferred Embodiments of Semiconductor Design Data Modifying System and Semiconductor Design Data Modifying Method FIG. 14 is a block diagram showing the first preferred embodiment of a semiconductor design data modifying system according to the present invention. The semiconductor design data modifying system shown in this figure comprises a main control part 11, a program storing part 13, a parameter input part 15, a design data processing part 89, a display part 35, a data retrieval control part 17 and a data bases DB1 through DB3, and further comprises a pattern checking part 17, a design modifying part 53, a numerical operation part and probability of failure evaluating part 55 and a data base DB6.

In this preferred embodiment, the parameter input part 15 inputs parameters of a lattices size and a lattice interval, which will be described later, to the design data processing part 19 via the main control part 11. The parameter input part 15 also inputs a desired probability of the failure serving as a threshold value which will be described later, to the numerical operation part and probability of failure evaluating part 55 via the main control part 11.

In this preferred embodiment, the data base DB6 stores therein the defect occurrence rule which has been obtained by the above described semiconductor defect analyzing system 3.

The data base DB3 stores therein a characteristic classification data (first characteristic classification data), which have been used for preparing the defect occurrence rule of the data base DB8 and which have been retrieved from the above described semiconductor analyzing system 3.

The design data processing part 89 retrieves a design data of a product serving as an object to be inspected from the data base DB1, and a design characteristic item data from the data base DB2. Moreover, the design data processing part 89 extracts an inspection region from the design data, which has been modified by the design modifying part 53 which will be described later, and divides the inspection region into lattice regions having the lattice size, which has been inputted from the parameter input part 15, at lattice intervals, which have been inputted from the parameter input part 15, to derive the numerical values of design characteristics with respect to the divided lattice regions every item of the characteristic item data, to store the results in the data base DB3 as a second characteristic classification data.

The pattern checking part 51 retrieves the first characteristic classification data from the data base DB3 and the defect occurrence rule from the data base DB6, and selects the lattice region which is common in comparison between the second characteristic classification data and the defect occurrence rule, supplies the information of the selected lattice to the data buffer of the data input/output interface and data buffer 27 to be held therein.

The design modifying part 53 retrieves the design data and modifies the pattern with respect to the lattice region, which has been selected by the pattern checking part 51 to be held in the data buffer of the data input/output interface and data buffer 27, to store the modified results in the data base DB1.

The numerical operation part and probability of failure evaluating part 55 retrieves the second characteristic classification data from the data base DB3 and the defect occurrence rule from the data base DB6 to compare them to calculate a defect causing probability (which will be hereinafter referred to as a "probability of a failure") with respect to the whole design. The numerical operation part and probability of failure evaluating part 55 also evaluates the value of the calculated probability of the failure. If it is determined that the value of the probability of the failure exceeds the desired probability of the failure inputted from the parameter input part 15 and is not the lowest probability of the failure, the numerical operation part and probability of failure evaluating part 55 supplies a signal indicative of the fact that a pattern modifying process should be executed again, to the main control part 11. The main control part 11 receives this signal to supply a command signal for executing a modifying process again, to the design modifying part 53.

Referring to the accompanying drawings, as the first preferred embodiment of a semiconductor design data modifying method according to the present invention, the operation of the above described semiconductor design data modifying system 5 will be described below in more detail.

Figure 15:
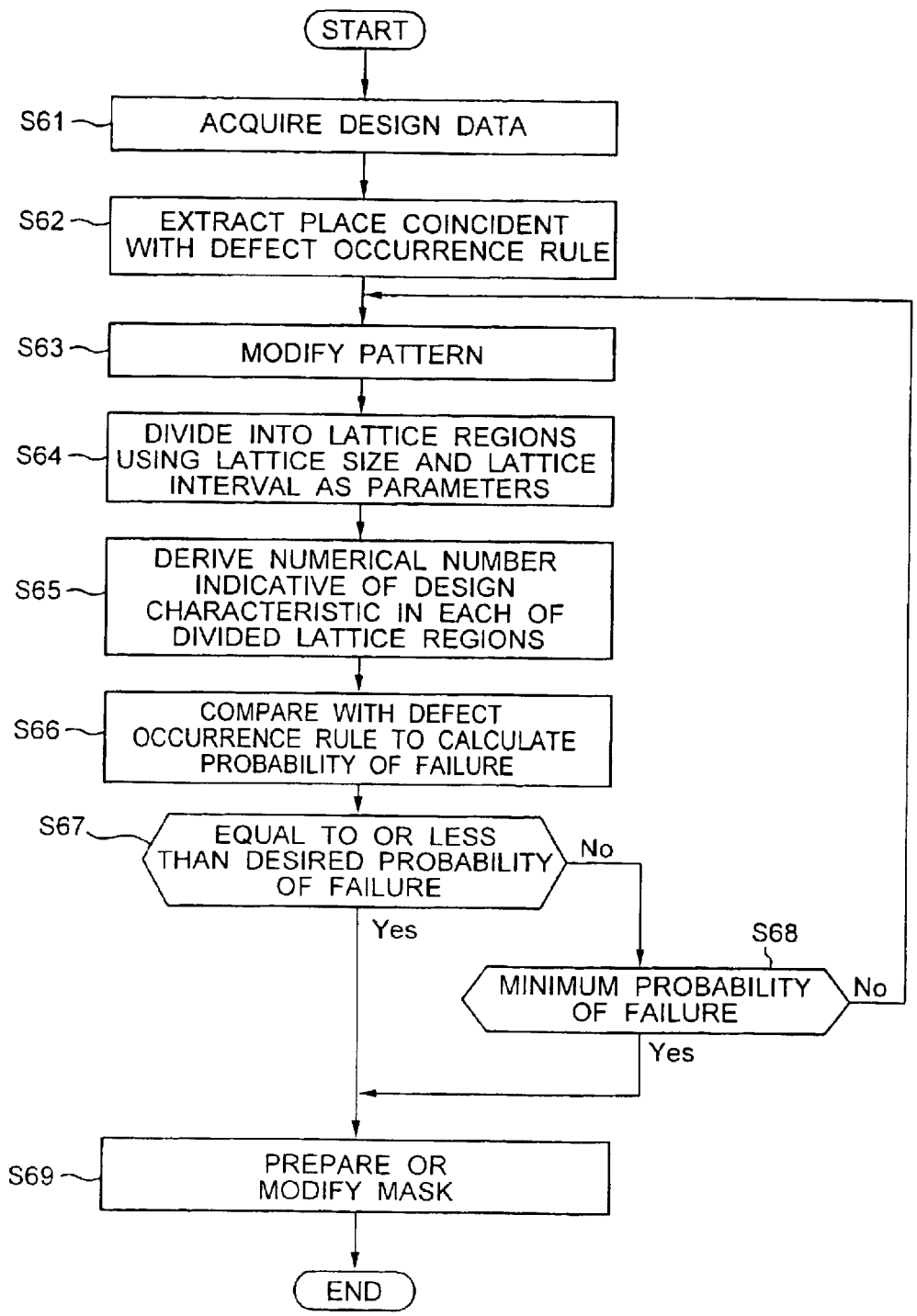
FIG. 15 is a flow chart for explaining the first preferred embodiment of a semiconductor design data modifying method according to the present invention.

FIG. 15 is a flow chart for explaining a semiconductor design data modifying method in this preferred embodiment.

First, a design data of a semiconductor device serving as an object to be design-changed is incorporated in the data base DB1 (step S61).

Then, the pattern checking part 51 retrieves the first characteristic classification data from the data base DB3 and the defect occurrence rule from the data base DB3, and extracts a pattern, which is coincident with pattern characteristics causing defects, from the first characteristic classification data (step S62), to supply the extracted pattern to the data input/output interface and data buffer 27 to cause the supplied pattern to be held in the data buffer.

The design modifying part 53 retrieves information on the pattern which has been extracted by the pattern checking part 51 to be held in the data input/output interface and data buffer 27, and modifies the design data with respect to the pattern (step S63) to store the modified design data in the data base DB1.

Then, the design data processing part 19 retrieves the modified design data from the data base DB1, and divides the modified design data into lattice regions in accordance with the parameters of the lattice size and lattice interval which are supplied from the parameter input part 15 (step S64). The combination of the lattice size and lattice interval may be previously determined or optionally determined. Moreover, the design data processing part 19 derives the numerical values of design characteristics every combination of the lattice size and lattice interval with respect to each of the divided lattice regions (step S65), and stores the numerical values of design characteristics in the data base DB3 as a second characteristic classification data.

Then, the numerical operation part and probability of failure evaluating part 55 retrieves the characteristic classification data from the data base DB3 and the defect occurrence rule from the data base DB6, and compares the second characteristic classification data with the defect occurrence rule to calculate a probability of a failure with respect to the modified design (step S66). Then, the numerical operation part and probability of failure evaluating part 55 receives a data of a desired probability of a failure from the parameter input part 15 again, and compares the calculated probability of the failure with the desired probability of the failure (step S67). If the calculated defect probability exceeds the desired probability of the failure and if there is some possibility that the design may be improved by modifying the design again (step S68), the numerical operation part and probability of failure evaluating part 55 supplies a signal indicative of the fact that it is required to modify the design again, to the main control part 11. The main control part 11 supplies a command signal for causing the design to be modified again, to the design modifying part 53 and the design data processing part 19. These processing parts repeat the above described steps S63 through S66.

If the probability of generating the failure with respect to the design modified again is equal to or less than the desired probability of the failure (step S67), or if the probability of generating the failure is not lowered even if the design is further modified (step S68), the preparation or modification of a mask is carried out using a design data at that time (step S69). The modification of the mask means the relief of a pattern using, e.g., a redundant circuit, or the like.

Conventionally, the occurrence (probability) of generating a failure is not considered in the verification of a design data. By using the semiconductor design data modifying method according to the present invention, it is possible to modify the pattern in a design stage before the production of products, so that it is possible to contribute to the improvement of yields in an early stage. In addition, by comparing the design data with the defect occurrence rule which is a rule between the combination of design characteristics of the pattern and the occurrence of the defect, it is possible to estimate the rate of occurrence of defects from the existing design data.

Figure 16:
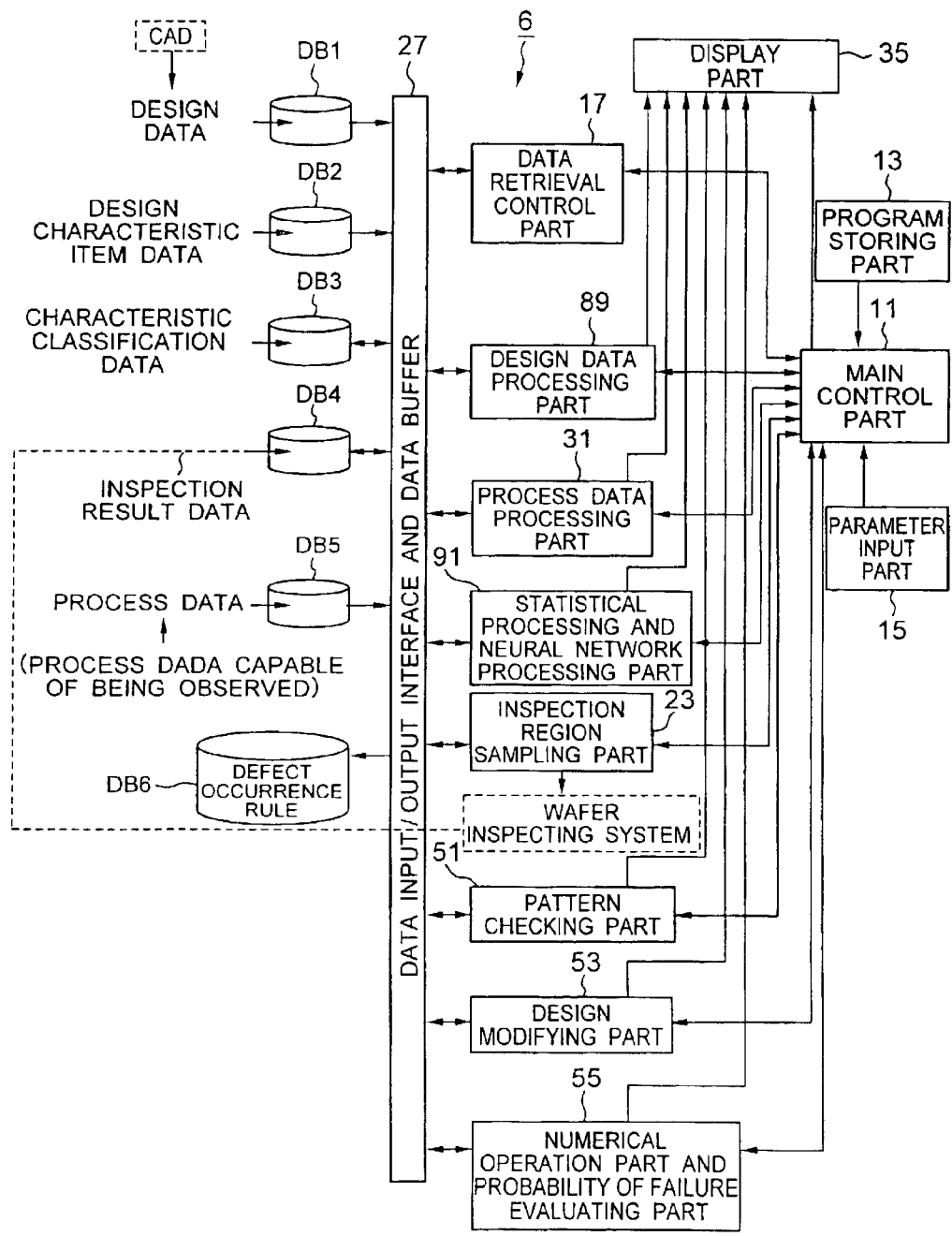
FIG. 16 is a block diagram showing the second preferred embodiment of a semiconductor design data modifying system according to the present invention.

FIG. 16 is a block diagram showing the second preferred embodiment of a semiconductor design data modifying system according to the present invention. As can be clearly seen from the comparison with FIGS. 2, 9 and 14, the semiconductor design data modifying system 6 in this preferred embodiment comprises components, which are substantially the same as all of components of the above described substrate inspecting system 1, semiconductor defect analyzing system 3 and semiconductor design data modifying system 5, and is designed to continuously execute all of the above described functions of these three systems. Therefore, the descriptions of the respective components are omitted, and referring to the accompanying drawings, as the second preferred embodiment of a semiconductor design data modifying method according to the present invention, the operation of the system will be described below in more detail. Furthermore, in this preferred embodiment, the design data processing part 89 constitutes a design characteristic item data preparing part, a design data processing part and a modified design data processing part. The statistical processing and neural network processing part 91 constitutes a characteristic classification data preparing part and a defect occurrence rule preparing part.

Figure 17:
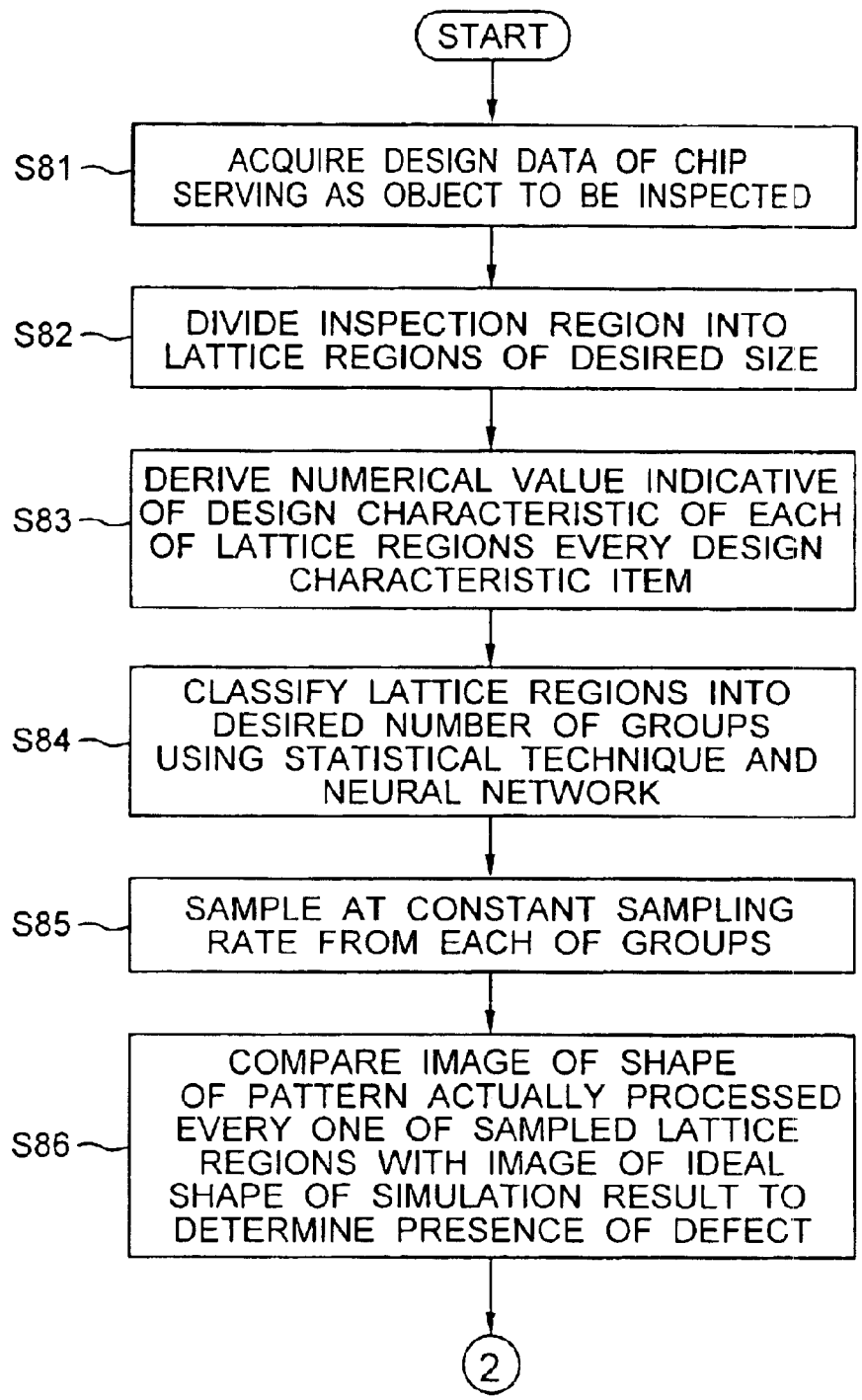
FIGS. 17 through 19 are flow charts for explaining the second preferred embodiment of a semiconductor design data modifying method according to the present invention.
Figure 18:
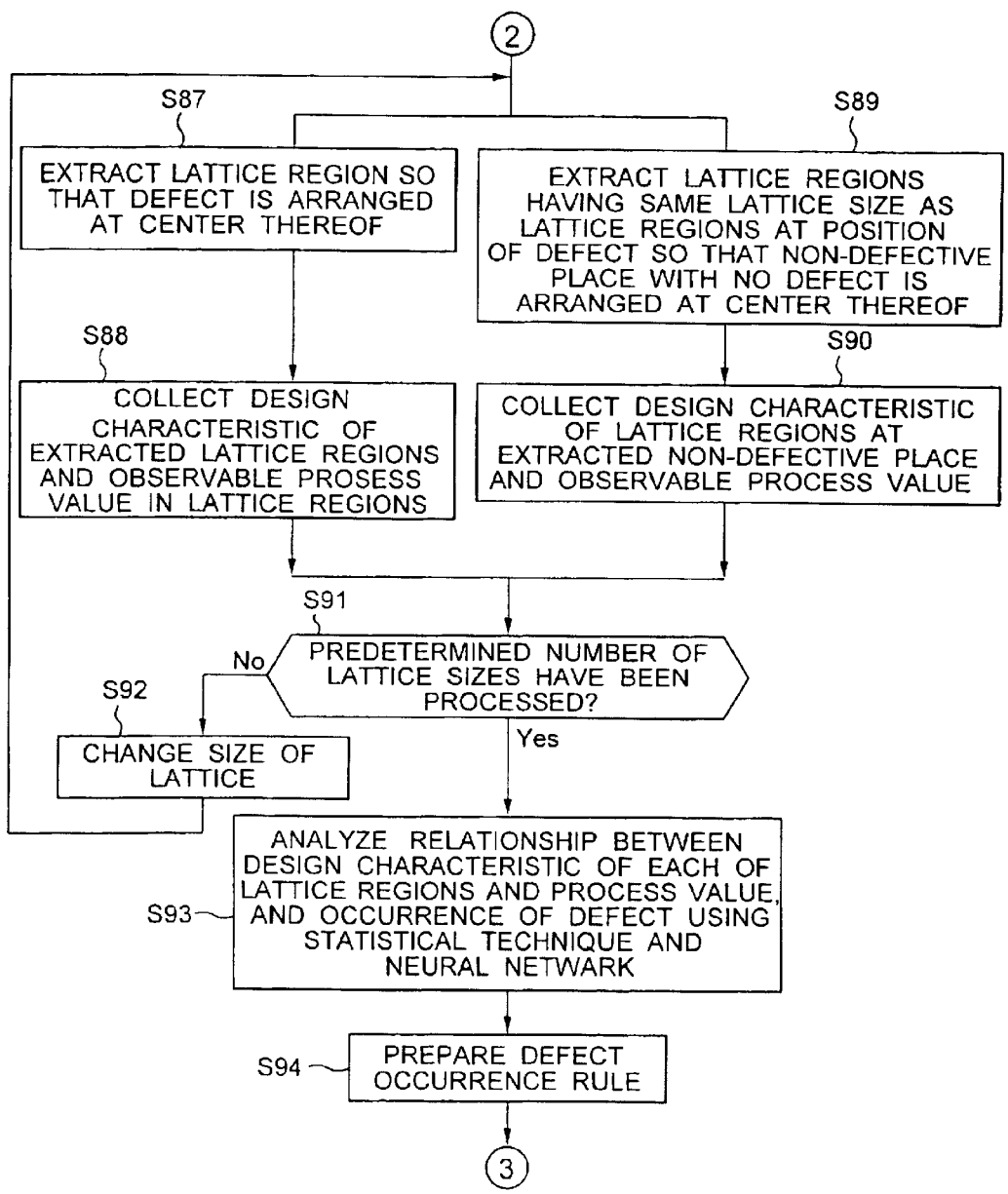
Figure 19:
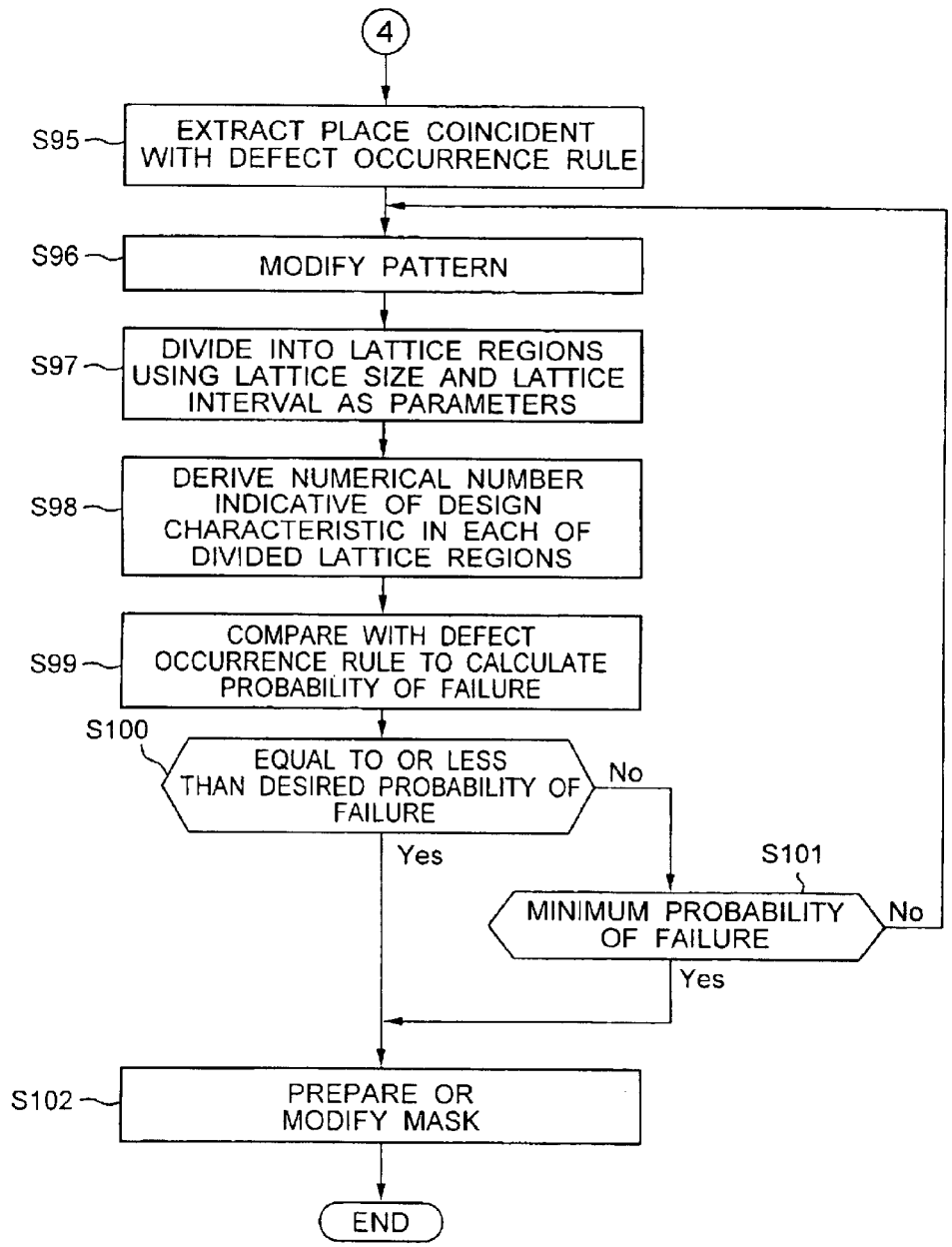

FIGS. 17 through 19 are flow charts for explaining a substrate defect analyzing method in this preferred embodiment.

First, as shown in FIG. 17, a design data of a chip serving as an object to be inspected is prepared as the data base DB1 (step S81).

Then, the design data processing part 89 divides an inspection region DM1 (see FIG. 4) into lattices of an optional size (first size) (step S82). Then, the design data processing part 89 extracts a data on design characteristic items (first design characteristic items) from the data base DB2, and derives the numerical value indicative of the respective design characteristics in a region (first lattice region) in the lattices of the first size every design characteristic item (step S83). The design data processing part 89 stores the numerical design characteristic item data in the data base DB3 as a first design characteristic item data.

Then, the statistical processing and neural network processing part 91 retrieves the first design characteristic item data from the data base DB3, and classifies the respective lattice regions into a predetermined number of groups using the statistical technique and the neural network (step S84). As an example of the statistical technique, a decision tree is used. This classification is not only carried out with respect to a single design characteristic, but it is also carried out with respect to the combination of a plurality of design characteristic. This classification is carried out so that lattice regions having characteristic values approximating to each other are included in the same group. The statistical processing and neural network processing part 91 stores the classified results in the data base DB3 as a first characteristic classification data.

Then, the inspection region sampling part 23 retrieves the first characteristic classification data from the data base DB3, and samples lattices from each of the groups at random at a constant rate with respect to the number of lattices belonging to the group (step S85). The results of the sampling are supplied to the outside wafer inspecting system.

The wafer inspecting system supplies information on the presence and degree of defects to the data base DB4 of the semiconductor defect analyzing system 4 as an inspection result data.

Then, the design data processing part 89 receives parameters concerning the lattice size (second size), which is different from the above described first size, from the parameter input part 15 via the main control part 11, and extracts a region (second lattice region) in the lattice having the second size from a design data so that the detected defect is arranged at the center thereof (step S87). Then, the design data processing part 89 derives the numerical values of design characteristics in the extracted lattice region every design characteristic item to store the numerical values in the data base DB3 as a second design characteristic item data. On the other hand, the design data processing part 89 extracts a lattice region (third lattice region), which has the same size as that of the lattice, at the center of which the defect is arranged, from the design data so that a non-defective place having no defect is arranged at the center thereof, by a procedure which is substantially the same as the procedure for preparing the second design characteristic item data with respect to the defect place (step S89), and derives the numerical values of the respective design characteristics to store them in the data base DB3 as a third design characteristic item data.

Then, the process data processing part 31 extracts the second characteristic item data which has been prepared with respect to the lattice region about the defect place, and collects a process data (the value of the first process result) relating to the design characteristics in the respective lattice regions from the data base DB5 (step S88). Similarly, the process data processing part 31 extracts the third design characteristic item data which has been prepared with respect to the lattice region about the non-defective place, and collects process data (the value of the second process result) relating to the design characteristics in the respective lattice regions from the data base DB5 (step S90).

If a predetermined number of lattice sizes (second sizes) are given from the parameter input part 15 (step S91), the design data processing part 89 and the process data processing part 31 change a predetermined number of lattice sizes (step S92), and repeat the above described processing (steps S87 through S90). After the processing for a single lattice size is terminated if the single lattice size is given and after the processing for a plurality of lattice sizes is terminated if the plurality of lattice sizes are given, the process data processing part 31 stores data indicative of the presence of defects, and the degree of the difference between the processed shape and the ideal shape when defects exist, together with the values of the process results, in the data base DB3 as a second characteristic classification data every lattice region or every lattice region having each of the sizes.

Then, the statistical processing and neural network processing part 91 extracts the second characteristic classification data including these information from the data base DB3 to analyze the extracted second characteristic classification data using the statistical processing and the neural network (step S93), and stores the respective design characteristics causing defects, the process results relating thereto, and the relationship between the presence of defects and the degree of defects, in the data base DB6 as a defect occurrence rule (step S94).

Then, the pattern checking part 51 retrieves the second characteristic classification data from the data base DB3 and the defect occurrence rule from the data base DB6, and extracts a pattern, which is coincident with the pattern characteristics causing defects, from the second characteristic classification data (step S95) to supply the extracted pattern to the data input/output interface and data buffer 27 to hold the supplied pattern in the data buffer.

Then, the design modifying part 53 retrieves information on the pattern which has been extracted by the pattern checking part 51 to be held in the data input/output interface and data buffer 27, and modifies the design data with respect to the pattern (step S96) to store the modified design data in the data base DB1.

Then, the design data processing part 89 retrieves the modified design data from the data base DB1, and divides the modified design data into lattice regions (fourth lattice regions) in accordance with the parameters of the lattice size (third size) and lattice interval which are supplied from the parameter input part 15 (step S97). The combination of the lattice size and lattice interval may be previously determined or optionally determined. Moreover, the design data processing part 89 derives the numerical values (fourth design characteristic item data) of design characteristics every combination of the lattice size and lattice interval with respect to each of the divided fourth lattice regions (step S98), and stores the numerical values of design characteristics in the data base DB3 as a third characteristic classification data.

Then, the numerical operation part and probability of failure evaluating part 55 retrieves the third characteristic classification data from the data base DB3 and the defect occurrence rule from the data base DB6, and compares the third characteristic classification data with the defect occurrence rule to calculate a probability of a failure (step S99). Then, the numerical operation part and probability of failure evaluating part 55 receives a data on a desired probability of a failure from the parameter input part 15, and compares the calculated probability of the failure with the desired probability of the failure (step S100). If the calculated probability of the failure exceeds the desired probability of the failure and if there is some possibility that the design may be improved by modifying the design again (step S101), the numerical operation part and defect probability evaluating part 55 supplies a signal indicative of the fact that it is required to modify the design again, to the main control part 11. The main control part 11 supplies a command signal for causing the design to be modified again, to the design modifying part 53, the design data processing part 89 and the numerical operation part and defect probability evaluating part 55. These processing parts repeat the above described steps S96 through S99.

If the probability of generating a failure with respect to the design modified again is equal to or less than the desired probability of the failure (step S100), or if the probability of the failure is not lowered even if the design is further modified (step S101), the preparation or modification of a mask is carried out using design data at that time (step S102).

According to the semiconductor defect analyzing method in this preferred embodiment, similar patterns can be uniformly and rapidly inspected, semiconductor defects are analyzed on the basis of the inspected results, and a design data is modified by a defect occurrence rule based thereon, so that it is possible to further contribute to the improvement of yields in an early stage. In addition, it is possible to precisely estimate the rate of occurrence of defects from the existing design data.

As the above described preferred embodiments of the semiconductor design data modifying system and semiconductor design data modifying method, while the system 5 for receiving the defect occurrence rule to modify the design data, and the semiconductor design data modifying system 6 for carrying out the processes from the sampling to the modification of the design data have been described, the present invention should not be limited to these preferred embodiments. For example, the system may include all of components of the systems shown in FIGS. 9 through 11, and the method may be a method for modifying a design data after obtaining information on the inspected results of a wafer without the need of sampling.

(4) Preferred Embodiments of Recorded Medium

A series of procedures in the above described substrate inspecting method, semiconductor defect analyzing method or semiconductor design data modifying method may be stored in a recordable medium, such as a floppy disk or a CD-ROM, as a program executed by a computer, and may be read and executed by the computer. Thus, the substrate inspecting method, semiconductor defect analyzing method and semiconductor design data modifying method according to the present invention can be realized by a general purpose computer. The recorded medium should not be limited to a portable medium such as magnetic disks or optical disks, it may be a fixed recorded medium such as a hard disk drive or a memory.

A program, in which a series of procedures for executing the above described substrate inspecting method, semiconductor defect analyzing method or semiconductor design data modifying method have been incorporated, may be distributed via communication lines such as Internet (including radio communication). Moreover, a program, in which a series of procedures for executing the above described substrate inspecting method, semiconductor defect analyzing method or semiconductor design data modifying method have been incorporated, may be distributed via a wire or radio circuit such as Internet or stored in a recorded medium to be distributed, while it is enciphered, modulated or compressed.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A semiconductor defect analyzing system comprising:
   a first memory for storing therein a design data of a semiconductor device;
   a data retrieving part for extracting an inspected object region from said first memory, said inspected object region being a region serving as an object to be inspected;
   a second memory for storing therein a defect inspection data concerning an actual defect and a degree of the defect which are obtained by inspecting a processed pattern which is processed on the basis of said design data;

a design data processing part for acquiring first lattice regions by dividing said inspected object region by a lattice having an arbitrary size on the basis of said defect inspection data so that a place at which said defect has occurred is arranged at the center thereof, said arbitrary size being given as a parameter, and for acquiring second lattice regions by dividing said inspected object region by said lattice on the basis of said defect inspection data so that a non-defective place of said processed pattern is arranged at the center thereof, said non-defective place being a place which is appropriately processed, and for preparing a first design characteristic item data and a second design characteristic item data every said first lattice region and every said second lattice region respectively by deriving a numerical value indicative of a design characteristic of said design data every said first lattice region and every said second lattice region respectively;

a third memory for storing therein a data on an observable process result relating to a processing of said pattern based on said design data;

a process data processing part for collecting a value of a first process result corresponding to a pattern in said first lattice region, and a value of a second process result corresponding to a pattern in said second lattice region; and a defect occurrence rule preparing part for preparing a defect occurrence rule by correlating a combination of said first design characteristic item data and said value of said first process result with said defect and the degree of said defect and by correlating a combination of said second design characteristic item data and said value of said second process result with said defect and the degree of said defect.

2. A semiconductor defect analyzing system according to claim 1, wherein said defect inspection data is a data prepared on the comparison of an ideal shape data with a shape data of said defect in said processed pattern, said ideal shape data being a simulation result based on said design data.

3. A semiconductor defect analyzing system according to claim 2, wherein:

said plurality of lattice sizes are given as said parameters, said design data processing part changes said lattice sizes on the basis of said parameters to prepare said first design characteristic item data and said second design characteristic item data with respect to said plurality of first lattice regions and said plurality of second lattice regions, respectively, said process data processing part collects a value of said first process result and a value of said second process result from said third memory with respect to said first lattice regions having a plurality of sizes and said second lattice regions, respectively, and said defect occurrence rule preparing part prepares said defect occurrence rule by correlating a combination of said lattice sizes, said first design characteristic item data and a value of said first process result with said defect and the degree of said defect and by correlating a combination of said lattice sizes, said second design characteristic item data and a value of said second process result with said defect and the degree of said defect.

4. A semiconductor design data modifying system comprising:

a memory for storing therein a data on a defect occurrence rule obtained by analyzing a correlation between the presence of a defect and the degree of said defect and a combination of design characteristic causing said defect and a value of a process result relating to said design characteristic;

a pattern checking part for extracting a pattern capable of causing a defect from a design data on the basis of said defect occurrence rule;

a design data modifying part for modifying said design data with respect to the extracted pattern to output a modified design data;

a modified design data processing part for receiving a data on an arbitrary lattice size and a data on an arbitrary lattice interval as first parameters which are used to analyze said modified design data, for obtaining lattice regions by dividing said modified design data into arbitrary combinations of said lattice interval and said lattice size, for deriving numerical values indicative of design characteristics of said modified design data with respect to the obtained lattice region, and for preparing a modified design characteristic item data; and an operation part for comparing said modified design characteristic item data with said defect occurrence rule and for calculating a probability of a failure, which is a defect causing probability.

5. A semiconductor design data modifying system according to claim 4, wherein a data on said defect occurrence rule is supplied from a semiconductor defect analyzing system and is stored in said memory.

6. A semiconductor design data modifying system according to claim 5, wherein a data on a desired threshold is applied to said operation part as a second parameter, and which further comprises a re-modification command part for comparing said probability of the failure with said desired threshold and for supplying a command for modifying said modified design data again to said design data modifying part, said design data processing part and said operation part until said probability of the failure reaches said desired threshold or until said probability of the failure reaches a minimum value.

7. A semiconductor defect analyzing method comprising the steps of:

acquiring first lattice regions by dividing an inspected object region in a design data by a lattice having an arbitrary size on the basis of a defect inspection data concerning an actual defect and a degree of the defect so that a place at which said defect occurs is arranged at the center thereof, and deriving a numerical value indicative of a design characteristic of said design data every one of said first lattice regions to prepare a first design characteristic item data, said defect and the degree of the defect being obtained by inspecting a processed pattern which is processed on the basis of said design data;

collecting a value of a first process result corresponding to a pattern in said first lattice regions on the basis of a data on an observable process result relating to a processing of said pattern based on said design data;

acquiring second lattice regions by dividing said inspected object region by a lattice of said arbitrary size on the basis of said defect inspection data so that an appropriate processed non-defective place is arranged at the center thereof, and deriving a numerical value indicative of a design characteristic of said design data every one of said second lattice regions and for preparing a second design characteristic item data;

collecting a value of a second process result corresponding to a pattern in said second lattice regions from a data on said process result; and preparing a defect occurrence rule by correlating a combination of said first design characteristic item data and a value of said first process result with said defect and the degree of said defect and by correlating a combination of said second design characteristic item data and a value of said second process result with said defect and the degree of said defect.

8. A semiconductor defect analyzing method according to claim 7, wherein said defect inspection data is a data prepared on the comparison of an ideal shape data with a shape data of said defect in said processed pattern, said ideal shape data being a simulation result based on said design data.

9. A semiconductor defect analyzing method according to claim 8, wherein said step of acquiring first lattice regions to prepare said first design characteristic item data, said step of collecting a value of a first process result, said step of acquiring second lattice regions and said step of collecting a value of a second process result are sequentially repeated while changing the size of the lattice reasons, and which further comprises a step of preparing said first design characteristic item data and the value of said first process result with respect to each of the first lattice regions of a plurality of sizes and of preparing said second design characteristic item data and the value of said second process result with respect to each of said second lattice regions of the plurality of sizes prior to said step of preparing a defect occurrence rule.

10. A semiconductor design data modifying method comprising the steps of:

extracting a pattern capable of causing a defect from a design data of a semiconductor device on the basis of a defect occurrence rule which is prepared on the basis of said design data and which is indicative of a correlation of the presence of the defect and the degree of the defect and a combination of a design characteristic of said design data causing a defect and a value of a process result relating to said design characteristic;

modifying said design data with respect to the extracted pattern to output a modified design data;

acquiring lattice regions by dividing said modified design data by an arbitrary combination of a lattice of an arbitrary size and an arbitrary lattice interval, deriving a numerical value indicative of a design characteristic of said modified design data with respect to each of said lattice regions and preparing a modified design characteristic item data; and comparing said modified design characteristic item data with said defect occurrence rule to calculate a probability of a failure, which is a defect causing probability.

11. A semiconductor design data modifying method according to claim 10, wherein said defect occurrence rule is prepared by a semiconductor defect analyzing method, said semiconductor defect analyzing method comprising the steps of:

acquiring first lattice regions by dividing an inspected object region in a design data by a lattice having an arbitrary size on the basis of a defect inspection data concerning an actual defect and a degree of the defect so that a place at which said defect occurs is arranged at the center thereof, and deriving a numerical value indicative of a design characteristic of said design data every one of said first lattice regions to prepare a first design characteristic item data, said defect and the degree of the defect being obtained by inspecting a processed pattern which is processed on the basis of said design data;

collecting a value of a first process result corresponding to a pattern in said first lattice regions on the basis of a data on an observable process result relating to a processing of said pattern based on said design data;

acquiring second lattice regions by dividing said inspected object region by a lattice of said arbitrary size on the basis of said defect inspection data so that an appropriate processed non-defective place is arranged at the center thereof, and deriving a numerical value indicative of a design characteristic of said design data every one of said second lattice regions and for preparing a second design characteristic item data;

collecting a value of a second process result corresponding to a pattern in said second lattice regions from a data on said process result; and preparing a defect occurrence rule by correlating a combination of said first design characteristic item data and a value of said first process result with said defect and the decree of said defect and by correlating a combination of said second design characteristic item data and a value of said second process result with said defect and the degree of said defect.

12. A computer readable recorded medium in which a program for causing a computer to execute a semiconductor defect analyzing method is stored, said semiconductor defect analyzing method comprising the steps of:

acquiring first lattice regions by dividing an inspected object region in a design data by a lattice having an arbitrary size on the basis of a defect inspection data concerning an actual defect and a degree of the defect so that a place at which said defect occurs is arranged at the center thereof, deriving a numerical value indicative of a design characteristic of said design data every one of said first lattice regions and preparing a first design characteristic item data, said defect and the degree of the defect being obtained by inspecting a processed pattern which is processed on the basis of said design data;

collecting a value of a first process result corresponding to a pattern in said first lattice regions on the basis of a data on an observable process result relating to a processing of said pattern based on said design data;

acquiring second lattice regions by dividing said inspected object region by a lattice of said arbitrary size on the basis of said defect inspection data so that an appropriate processed non-defective place is arranged at the center thereof, and deriving a numerical value indicative of a design characteristic of said design data every one of said second lattice regions and for preparing a second design characteristic item data;

collecting a value of a second process result corresponding to a pattern in said second lattice regions from a data on said process result; and preparing a defect occurrence rule by correlating a combination of said first design characteristic item data and a value of said first process result with said defect and the degree of said defect and by correlating a combination of said second design characteristic item data and a value of said second process result with said defect and the degree of said defect.

13. A computer readable recorded medium according to claim 12, wherein said defect inspection data is a data prepared on the comparison of an ideal shape data with a shape data of said defect in said processed pattern, said ideal shape data being a simulation result based on said design data.

14. A computer readable recorded medium according to claim 13, wherein said semiconductor defect analyzing method further comprising:

a step, wherein said step of acquiring first lattice regions to prepare said first design characteristic item data, said step of collecting a value of a first process result, said step of acquiring second lattice regions and said step of collecting a value of a second process result are sequentially repeated while changing the size of the lattice regions, and a step of preparing aid first design characteristic item data and the value of said first process result with respect to each of the first lattice regions of a plurality of sizes and of preparing said second design characteristic item data and the value of said second process result with respect to each of said second lattice regions of the plurality of sizes prior to said step of preparing a defect occurrence rule.

15. A computer readable recorded medium in which a program for causing a computer to execute a semiconductor defect analyzing method, said semiconductor defect analyzing method comprising the steps of:

extracting an inspected object region from a design data of a semiconductor device and preparing first lattice regions by dividing said inspected object region into lattices of an arbitrary first size, said inspected object region serving as an object to be inspected, and, said arbitrary first size being given as a first parameter, preparing a first design characteristic item data by deriving a numerical number indicative of a design characteristic of said design data every one of said first lattice regions;

preparing a characteristic classification data by classifying said design characteristic item data into a desired number of groups;

extracting said lattice regions at random from said characteristic classification data at a constant sampling rate with respect to the number of said lattice regions belonging to the groups;

acquiring second lattice regions by dividing said inspected object region in said design data into lattices of a second size so that a place causing said defect is arranged at the center thereof on the basis of a defect inspection data relating to an actual defect and a degree of the defect of the processed patterns which are processed on the basis of said design data, the second size being given as a second parameter, and, said actual defect and the degree of the defect being obtained by inspecting a pattern of said lattice region which is extracted at said sampling rate;

deriving a numerical value indicative of a design characteristic of said design data every one of said second lattice regions to prepare a second design characteristic item data;

collecting a value of a first process result corresponding to a pattern in said second lattice regions on the basis of a data on an observable process result relating to a processing of the pattern based on the design data;

obtaining third lattice regions by dividing said inspected object region into lattices of said second size so that a processed non-defective place is arranged at the center thereof on the basis of said defect inspection data and deriving a numerical value indicative of a design characteristic of said design data every one of said obtained third lattice regions to prepare a third design characteristic item data;

collecting a value of a second process result corresponding to a pattern in said third lattice regions from a data on said process result;

preparing a defect occurrence rule by acquiring a first correlation between said defect and the degree of said defect and a combination of said second design characteristic item data and the value of said first process result, and a second correlation between the value of said second process result and said defect and the degree of said defect and a combination of said third design characteristic item data.

16. A computer readable recorded medium in which a program for causing a computer to execute a semiconductor design data modifying method, said semiconductor design data modifying method comprising the steps of:

extracting a pattern capable of causing a defect from a design data of a semiconductor device on the basis of a defect occurrence rule which is prepared on the basis of said design data and which is indicative of a correlation of the presence of the defect and the degree of the defect and a combination of a design characteristic of said design data causing a defect and a value of a process result relating to said design characteristic;

modifying said design data with respect to the extracted pattern to output a modified design data;

acquiring lattice regions by dividing said modified design data by an arbitrary combination of a lattice of an arbitrary size and an arbitrary lattice interval, deriving a numerical value indicative of a design characteristic of said modified design data with respect to each of said lattice regions and preparing a modified design characteristic item data; and comparing said modified design characteristic item data with said defect occurrence rule to calculate a probability of a failure, which is a defect causing probability.

* * * * *